(12) United States Patent
Ikeda

(10) Patent No.: US 10,891,493 B2
(45) Date of Patent: Jan. 12, 2021

(54) CROWD TYPE CLASSIFICATION SYSTEM, CROWD TYPE CLASSIFICATION METHOD AND STORAGE MEDIUM FOR STORING CROWD TYPE CLASSIFICATION PROGRAM

(71) Applicant: NEC CORPORATION, Tokyo (JP)

(72) Inventor: Hiroo Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1 day.

(21) Appl. No.: 16/512,496

(22) Filed: Jul. 16, 2019

(65) Prior Publication Data

US 2019/0340444 A1 Nov. 7, 2019

Related U.S. Application Data

(63) Continuation of application No. 16/082,763, filed as application No. PCT/JP2017/007643 on Feb. 28, 2017, now Pat. No. 10,789,484.

(30) Foreign Application Priority Data

Mar. 7, 2016 (JP) .................................. 2016-043157

(51) Int. Cl.
*G06K 9/00* (2006.01)
*G06T 7/70* (2017.01)
(Continued)

(52) U.S. Cl.
CPC ....... *G06K 9/00778* (2013.01); *G06K 9/6218* (2013.01); *G06K 9/6267* (2013.01);
(Continued)

(58) Field of Classification Search
CPC ............. G06K 9/00778; G06K 9/6218; G06K 9/6267; G06T 2207/10016;
(Continued)

(56) References Cited

U.S. PATENT DOCUMENTS

2015/0120237 A1* 4/2015 Gouda ................... G01C 21/00
702/150
2016/0132755 A1 5/2016 Ikeda
(Continued)

FOREIGN PATENT DOCUMENTS

JP 2007-265290 A 10/2007
JP 2011-248548 A 12/2011
(Continued)

OTHER PUBLICATIONS

Non-Final Office Action dated Feb. 24, 2020, from the United States Patent and Trademark Office in U.S. Appl. No. 16/082,763.
(Continued)

*Primary Examiner* — Tom Y Lu
(74) *Attorney, Agent, or Firm* — Sughrue Mion, PLLC

(57) ABSTRACT

A crowd type classification system of an aspect of the present invention includes: a staying crowd detection unit that detects a local region indicating a crowd in staying from a plurality of local regions determined in an image acquired by an image acquisition device; a crowd direction estimation unit that estimates a direction of the crowd for an image of a part corresponding to the detected local region, and appends the direction of the crowd to the local region; and a crowd type classification unit that classifies a type of the crowd including a plurality of staying persons for the local region to which the direction is appended by using a relative vector indicating a relative positional relationship between two local regions and directions of crowds in the two local regions, and outputs the type and positions of the crowds.

15 Claims, 14 Drawing Sheets

(51) Int. Cl.
*G06T 7/60* (2017.01)
*G06T 7/246* (2017.01)
*G06K 9/62* (2006.01)

(52) U.S. Cl.
CPC .............. *G06T 7/246* (2017.01); *G06T 7/60* (2013.01); *G06T 7/70* (2017.01); *G06T 2207/10016* (2013.01); *G06T 2207/30196* (2013.01)

(58) Field of Classification Search
CPC .......... G06T 2207/30196; G06T 7/246; G06T 7/60; G06T 7/70
See application file for complete search history.

(56) References Cited

U.S. PATENT DOCUMENTS

| | | | |
|---|---|---|---|
| 2017/0132475 A1* | 5/2017 | Oami | G06M 11/00 |
| 2017/0213090 A1 | 7/2017 | Oami et al. | |
| 2018/0061081 A1* | 3/2018 | Nagao | G06K 9/00778 |
| 2018/0330170 A1* | 11/2018 | Oya | G06T 7/292 |
| 2019/0180447 A1 | 6/2019 | Komiya et al. | |
| 2019/0200436 A1 | 6/2019 | Den Hartog et al. | |
| 2019/0205660 A1 | 7/2019 | Miyano | |

FOREIGN PATENT DOCUMENTS

| | | |
|---|---|---|
| JP | 2011-248836 A | 12/2011 |
| WO | 2005/039181 A1 | 4/2005 |
| WO | 2014/207991 A1 | 12/2014 |
| WO | 2015/040929 A1 | 3/2015 |

OTHER PUBLICATIONS

Notice of Allowance dated Jun. 10, 2020 issued in U.S. Appl. No. 16/082,763.
Masahiro Kunimoto et.al: Study of Automation of Virtual Camera for Animation using Technology of Movie, 52th (Prior Period of 1996) National Convention Lecture Paper Collection (2) Artificial intelligence and cognitive science Media information processing Mar. 6, 1996 pp. 2-357-2-258.
Written Opinion for PCT/JP2017/007643, dated May 30, 2017.
International Search Report for PCT/JP2017/007643, dated May 30, 2017.

* cited by examiner

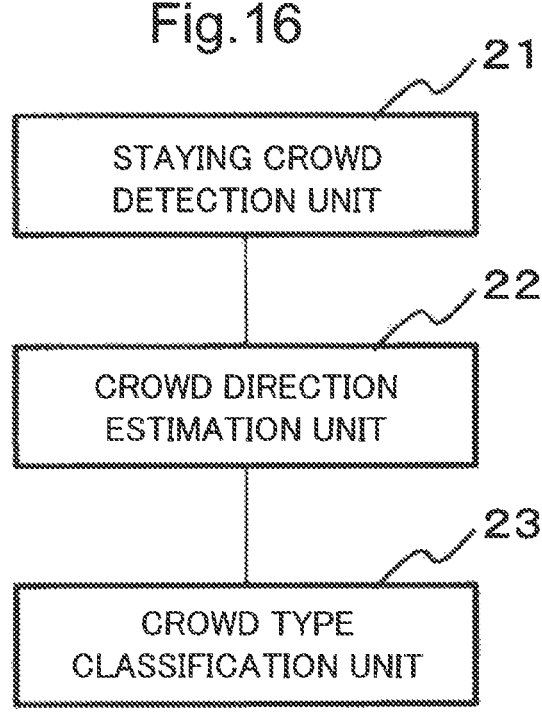
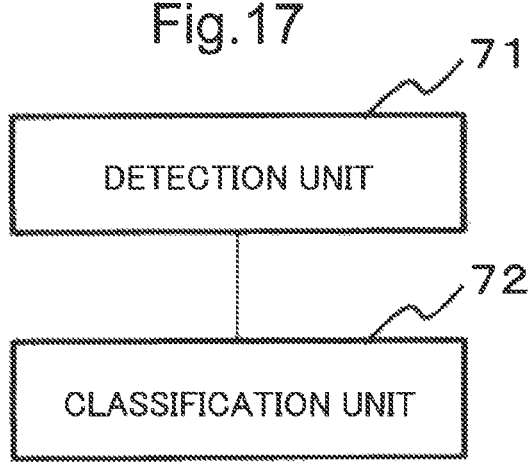

CROWD TYPE CLASSIFICATION SYSTEM, CROWD TYPE CLASSIFICATION METHOD AND STORAGE MEDIUM FOR STORING CROWD TYPE CLASSIFICATION PROGRAM

CROSS REFERENCE TO RELATED APPLICATIONS

This Application is a Continuation of U.S. application Ser. No. 16/082,763, filed Sep. 6, 2018, which is a National Stage of International Application No. PCT/JP2017/007643, filed Feb. 28, 2017, claiming priority based on Japanese Patent Application No. 2016-043157, filed Mar. 7, 2016, the disclosures of which are incorporated herein in their entirety by reference.

TECHNICAL FIELD

The present invention relates to a crowd type classification system, a crowd type classification method and a storage medium storing a crowd type classification program for classifying the type of a crowd or crowds included in an image.

BACKGROUND ART

A system that extracts the number of persons in a line is described in PTL 1. The system described in PTL 1 extracts a region of persons in an image by a background differencing technique. In the system described in PTL 1, a detection region for a line is determined in advance in the image. The system described in PTL 1 extracts in the detection region the number of persons in a line. The technology described in PTL 1 enables detection of a type "line" of a crowd in the detection region.

PTL 2 discloses a system that detects a group having a high irregularity. PTL 3 discloses a system that detects an area and the like indicating staying of persons or the like in a region of a moving image.

PTL 4 discloses a crowd state recognition device that is capable of recognizing the numbers of persons in various regions of an image, and of recognizing directions of crowds in the various regions of the image. PTL 4 further discloses a training data generation device that generates, by machine learning, a dictionary of a discriminator which is used by the crowd state recognition device when performing recognition processing.

CITATION LIST

Patent Literature

PTL 1: Japanese Unexamined Patent Publication No. 2007-265290
PTL 2: PCT Internal Publication No. 2015/040929
PTL 3: Japanese Unexamined Patent Publication No. 2011-248836
PTL 4: PCT Internal Publication No. 2014/207991

SUMMARY OF INVENTION

Technical Problem

A type of a staying crowd may be, for example, "lining up", "surrounding" or the like. However, the technology described in PTL 1 is capable of detecting only the crowd type "lining up" in an image. It is preferable that various types of staying crowds can be classified in an image.

For that reason, an object of the present invention is to provide a crowd type classification system, a crowd type classification method and a storage medium storing a crowd type classification program which are capable of classifying various types of the staying crowds in an image.

Solution to Problem

A crowd type classification system according to an aspect of the present invention includes: staying crowd detection means for detecting a local region indicating a crowd in staying from a plurality of local regions determined in an image acquired by an image acquisition device; crowd direction estimation means for estimating a direction of the crowd for an image of a part corresponding to the local region detected by the staying crowd detection means, and appending the direction of the crowd to the local region; and crowd type classification means for classifying a type of the crowd including a plurality of staying persons for the local region to which the direction is appended by the crowd direction estimation means by using a relative vector indicating a relative positional relationship between two local regions and directions of crowds in the two local regions, and outputting the type and positions of the crowds.

A crowd type classification system according to an aspect of the present invention includes: detection means for detecting a plurality of partial regions each indicating crowds in staying in an image; and classification means for analyzing a first partial region and a second partial region, and classifying types of the crowds in the first partial region and the second partial region.

A crowd type classification method according to an aspect of the present invention includes: detecting a local region indicating a crowd in staying in local regions determined in an image acquired by an image acquisition device; estimating a direction of the crowd for an image of a part corresponding to the local region detected and appending the direction of the crowd to the local region detected; and classifying a type of the crowd including a plurality of staying persons for the local region with the direction of the crowd by using a relative vector indicating a relative positional relationship between two local regions and directions of crowds in the two local regions, and outputting the type and positions of the crowd.

A crowd type classification method according to an aspect of the present invention includes: detecting a plurality of partial regions each indicating crowds in staying in an image; and analyzing a first partial region and a second partial region, and classifying types of the crowds in the first partial region and the second partial region.

A storage medium according to an aspect of the present invention stores a crowd type classification program causing a computer to execute: a staying crowd detection process of detecting a local region indicating a crowd in staying in local regions determined in an image acquired by an image acquisition device; a crowd direction estimation process of estimating a direction of the crowd for an image of a part corresponding to the local region detected and appending the direction of the crowd to the local region detected; and a crowd type classification process of classifying a type of the crowd including a plurality of staying persons for the local region to which the direction is appended by the crowd direction estimation process by using a relative vector indicating a relative positional relationship between two local regions and directions of crowds in the two local regions and outputting the type and positions of the crowd.

A storage medium according to an aspect of the present invention stores a crowd type classification program causing a computer to execute: a detection process of detecting a plurality of partial regions each indicating crowds in staying in an image; and a classification process of analyzing a first partial region and a second partial region, and classifying types of the crowds in the first partial region and the second partial region.

An aspect of the present invention is also achieved by the crowd type classification programs stored in the above-described storage media.

Advantageous Effects of Invention

According to the present invention, various types of staying crowds in an image can be classified.

BRIEF DESCRIPTION OF DRAWINGS

FIG. 16 is a block diagram illustrating a configuration example of a crowd type classification system according to a fourth example embodiment of the present invention.

FIG. 17 is a block diagram illustrating a configuration example of a crowd type classification system according to a fifth example embodiment of the present invention.

DESCRIPTION OF EXAMPLE EMBODIMENTS

Example embodiments of the present invention are described below with reference to the drawings.

First Example Embodiment

Figure 1:
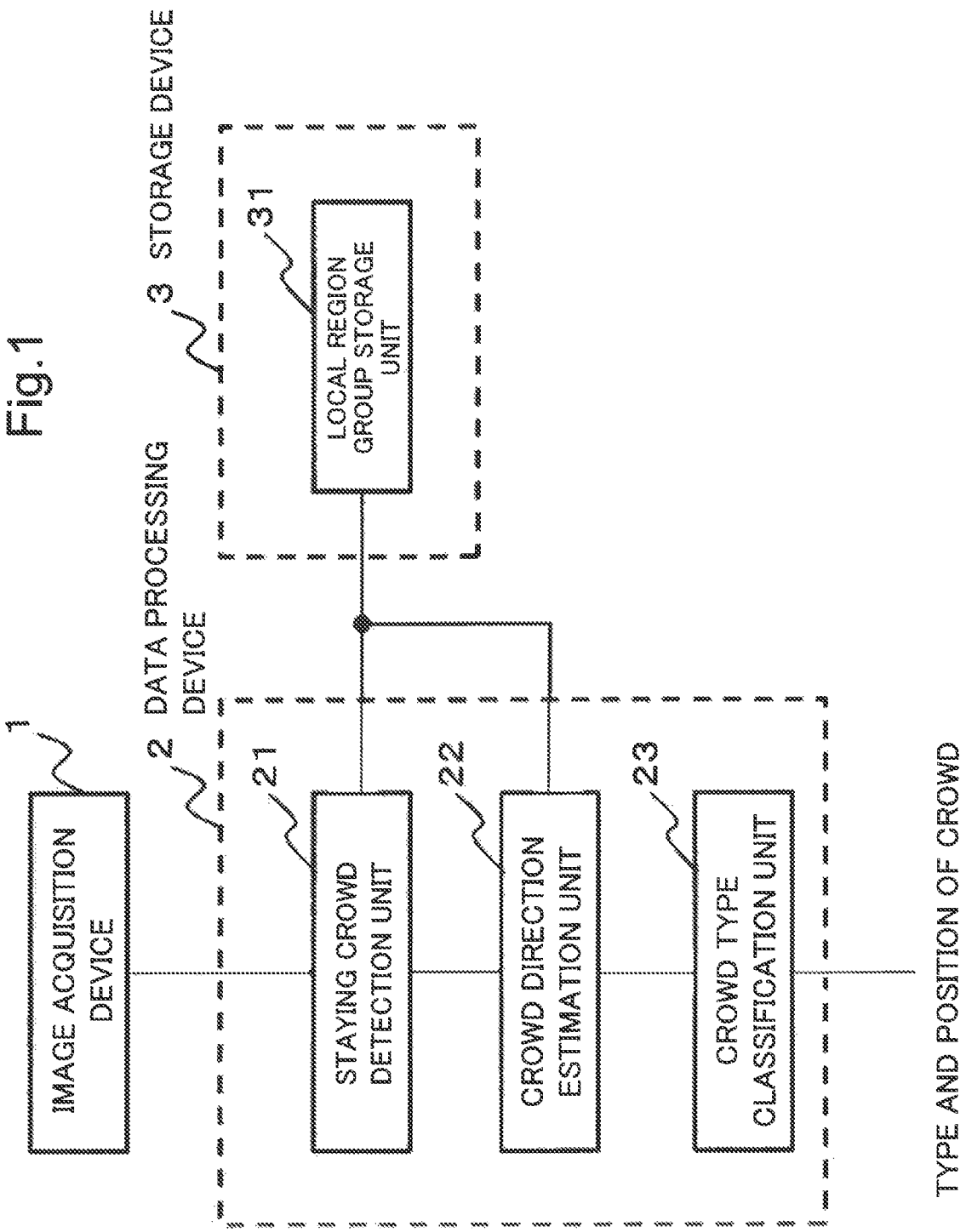
FIG. 1 is a block diagram illustrating a configuration example of a crowd type classification system according to a first example embodiment of the present invention.

FIG. 1 is a block diagram illustrating a configuration example of a crowd type classification system according to a first example embodiment of the present invention. The crowd type classification system according to the first example embodiment of the present invention includes an image acquisition device 1, a data processing device 2 that operates under control of a program, and a storage device 3 configured to store information. The image acquisition device 1 is configured to acquire an image from an output of an imaging device such as a camera or from an output of a video device such as video equipment.

The storage device 3 includes a local region group storage unit 31.

The local region group storage unit 31 is configured to store positions and sizes of individual local regions located in an image. A position and a size of each of the local regions are determined in advance. Basically, positions and sizes of the individual local regions are determined in such a way that the local regions cover the entire image. However, the mode of determining the local regions is not limited to the example described above, and local regions may be determined only for a region for classification of a crowd type of a crowd in the image. The local regions may be determined in such a way that the local regions overlap with each other. The sizes of the local regions are determined depending on functions of the staying crowd detection unit 21 and the crowd direction estimation unit 22 and the like described later.

Hereinafter, an image of a part corresponding to the local region in an image is referred to as a local region image.

The data processing device 2 includes a staying crowd detection unit 21, a crowd direction estimation unit 22, and a crowd type classification unit 23.

The staying crowd detection unit 21 estimates a staying degree of objects and the number of persons in a local region for each of the local region images specified by the local regions determined in advance (in other words, by the positions and sizes of the local regions stored in the local region group storage unit 31) in an image (i.e. an image acquired by the image acquisition device 1). The staying degree of objects is a value indicating a state of staying of the objects. The number of persons in the local region is a value indicating density of a crowd. The staying crowd detection unit 21 detects, based on these two values, a local region of a staying crowd among the local regions.

Figure 2:
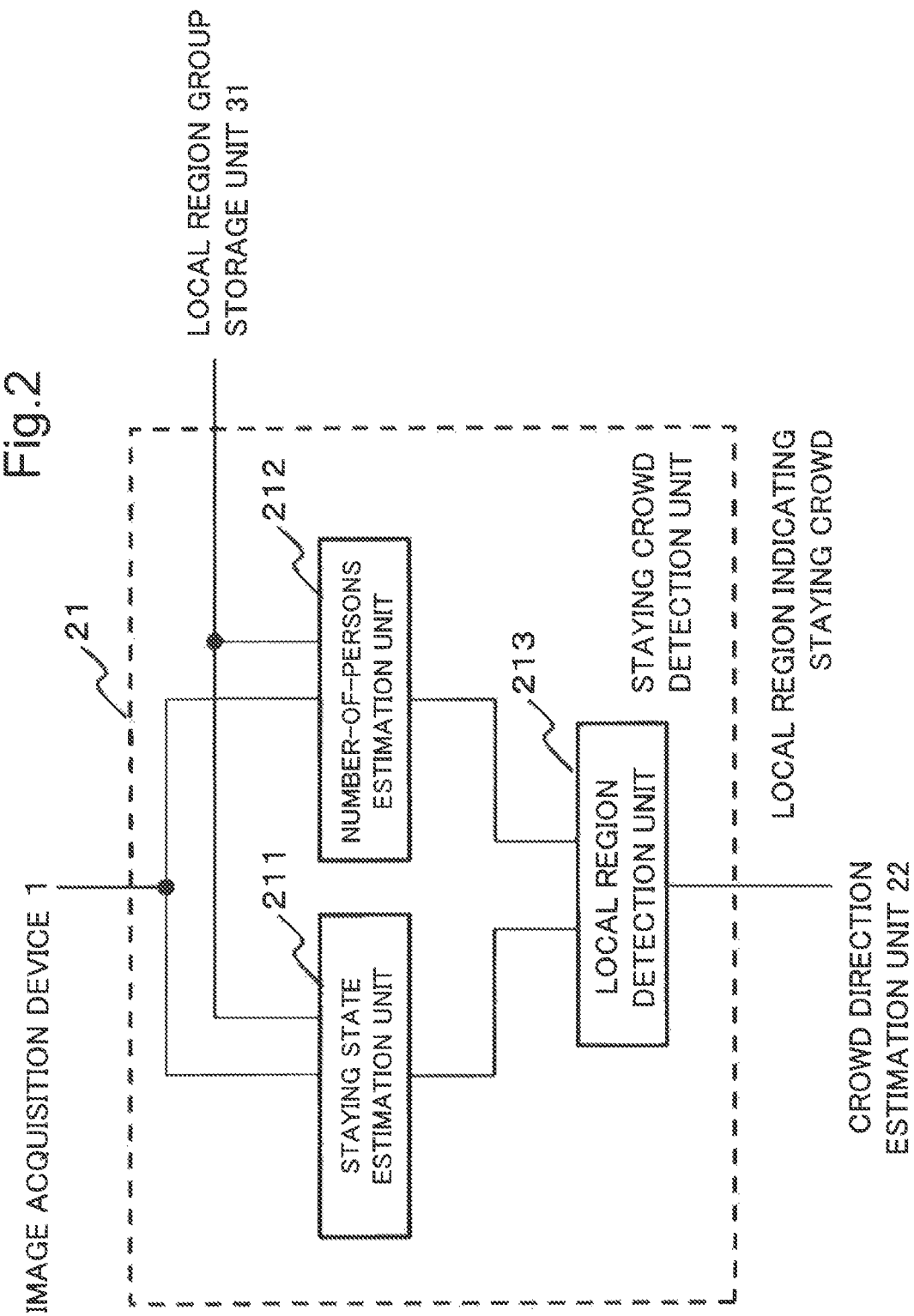
FIG. 2 is a block diagram illustrating a configuration example of a staying crowd detection unit according to the first example embodiment of the present invention.

FIG. 2 is a block diagram indicating a configuration example of the staying crowd detection unit 21. The staying crowd detection unit 21 includes a staying state estimation unit 211, a number-of-persons estimation unit 212, and a local region detection unit 213.

The staying state estimation unit 211 estimates the staying degree of objects in each of the local region images specified by the local regions determined in advance in the image acquired by the image acquisition device 1. The term "object" is not limited to a crowd, and means various objects including a crowd. For example, when the local region image includes vehicles, trees, buildings in addition to a crowd, the staying state estimation unit 211 estimates the staying degree of the whole of these objects including a crowd.

An example of a method of estimating a staying degree of objects is described below.

The staying state estimation unit 211 may calculate a similarity of feature values of image patterns, motion vectors, or amounts of difference between frames from local region images that are of the same place and are acquired at different times. It can be said that these values indicate a degree of movement of an object appearing in the local regions. The similarity of feature values of the image patterns has characteristics that a staying degree becomes larger as the similarity becomes larger. The motion vector has characteristics that the staying degree becomes larger as the magnitude of the motion vector becomes smaller. The amount of difference between the frames has characteristics that the staying degree becomes larger as the value of the amount become smaller. Using these features, the staying state estimation unit 211 may estimate the staying degree of objects based on calculated values.

Alternatively, an estimator may be acquired in advance by learning in so that the estimator output a staying degree of objects upon reception of an input of local region images that are of the same place and are acquired at different times. The staying state estimation unit 211 may input, into the estimator, local region images that are of the same place and are acquired at different times, and thereby obtain an estimation value of the staying degree of objects. The above-described learning of the estimator may be performed by using two local region images acquired at different times when objects are staying, two local region images acquired at different times when objects are not staying, and information indicating the states of staying of objects in those cases. It can be said that this learning is local-region-based learning.

Alternatively, a motion sensor may be installed in such a way that the motion sensor detects motion of objects in a real space corresponding to the local region. The staying state estimation unit 211 may estimate a staying degree of objects included in the local region image on the basis of a result of detection by the motion sensor.

The method of estimating the staying degree may be other than the method illustrated above as an example.

The number-of-persons estimation unit 212 estimates the number of persons in each of the local regions in the local region images specified by the local regions determined in advance in the image acquired by the image acquisition device 1.

The number-of-persons estimation unit 212 may estimate the number of persons in the local region by using the estimator acquired by learning. For example, an estimator may be acquired in advance by learning so that the estimator outputs the number of persons in a local region upon reception of an input of a local region image. The number-of-persons estimation unit 212 may input a local region image into the estimator and thereby obtain an estimated number of persons in the local region. The above-described learning of the estimator may be performed by using a local region image including a crowd consisting of a plurality of persons and information relating to the numbers of persons in the local region image. It can be said that this learning is local-region-based learning. This technology is described also in PTL 4.

The method of estimating the number of persons in the local region may be other than the method described above as an example.

The local region detection unit 213 detects all the local regions each indicating staying crowds, from the local regions determined in advance, by using a staying degree of objects, which is estimated by the staying state estimation unit 211, and the number of persons in a local region, which is estimated by the number-of-persons estimation unit 212. Specifically, the local region detection unit 213 detects all the local regions for each of which a staying degree of objects larger than a predetermined threshold value is estimated and in each of which the number of persons is larger than a predetermined threshold value. The threshold value for the staying degree and the threshold value for the number of persons are determined independently.

The crowd direction estimation unit 22 estimates a direction of the crowd in the local region image corresponding to the local region detected by the staying crowd detection unit 21, and appends the direction of the crowd to the corresponding local region. Specifically, the crowd direction estimation unit 22 appends information indicating a direction of the crowd to the local region.

The direction of the crowd may be, for example, a direction to which faces of a majority of persons included in a local region direct in the local region in an image. The direction of the crowd may be, for example, a direction to which bodies of a majority of persons included in a local region direct in the local region in an image. The direction of the crowd may be, for example, a direction in which a majority of persons included in a local region are watching in the local region in an image. The direction of the crowd may be determined based on, for example, a purpose of a person conducting learning of the estimator for estimating the direction of the crowd as described below. The direction of the crowd is not limited to the examples described above.

Figure 3:
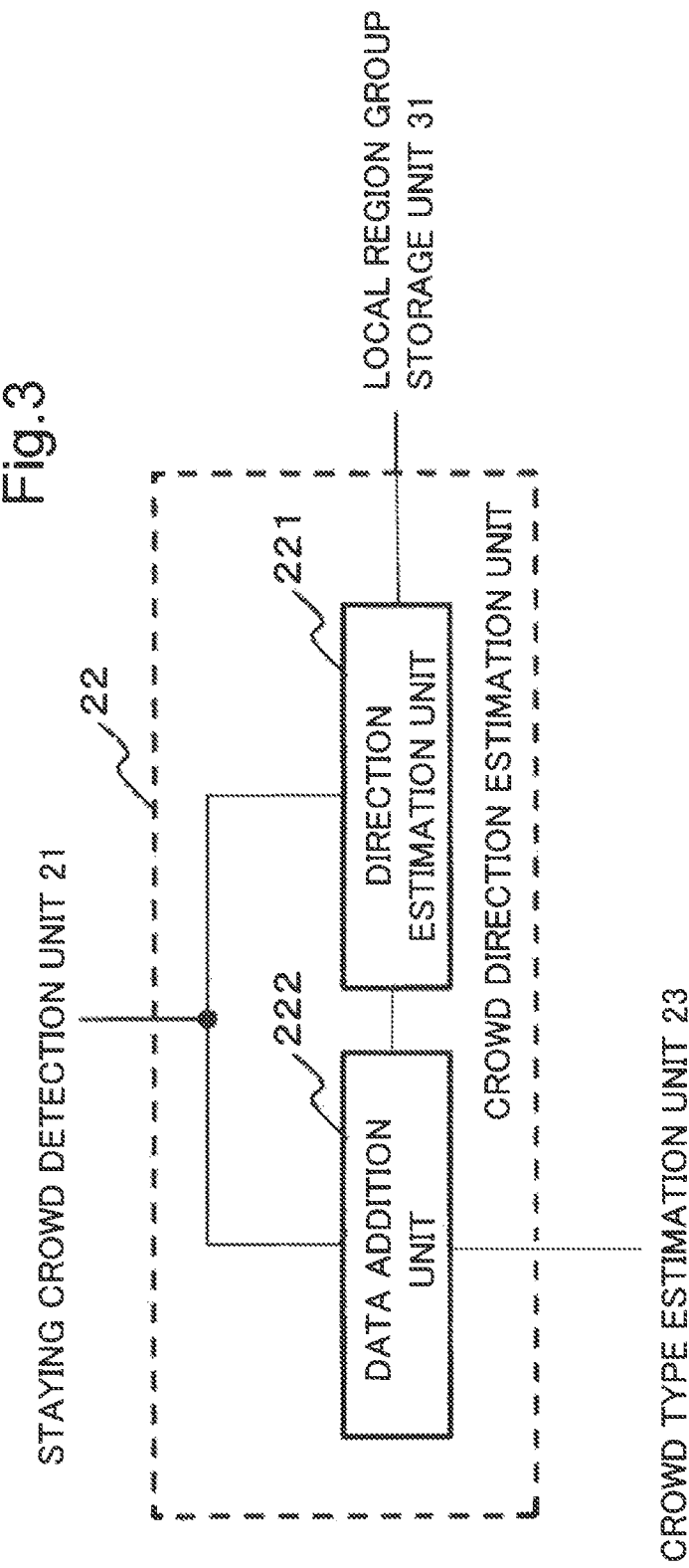
FIG. 3 is a block diagram illustrating a configuration example of a crowd direction estimation unit according to the first example embodiment of the present invention.

FIG. 3 is a block diagram illustrating a configuration example of the crowd direction estimation unit 22. The crowd direction estimation unit 22 includes a direction estimation unit 221 and a data append unit 222.

The direction estimation unit 221 estimates a direction of the crowd in the local region image corresponding to the local region detected by the staying crowd detection unit 21. The direction estimation unit 221 may be configured to estimate the direction of the crowd by using the estimator obtained by learning. For example, an estimator may be acquired in advance by learning so that the estimator outputs a direction of the crowd in the local region image upon reception of an input of the local region image.

The direction estimation unit 221 may input a local region image corresponding to a local region detected by the staying crowd detection unit 21 into the estimator, and thereby estimates a direction of a crowd. The above-described learning of the estimator may be performed by using a local region image indicating a crowd including a plurality of persons facing various directions, and a vector or an angle indicating the representative direction of the crowd corresponding to the local region image. It can be said that the learning is local-region-based learning. This technology is described also in PTL 4.

The method of estimating a direction of a crowd may be other than the method illustrated above.

The data append unit 222 appends information indicating the estimated direction of the crowd to the corresponding local region.

The crowd type classification unit 23 executes the following processes for each local region combination, i.e. two local regions, obtained from the local regions to each of which information indicating a direction of a crowd is appended. The crowd type classification unit 23 classifies the crowd type of crowds including a plurality of staying persons and determines the positions of the crowds by using a vector indicating a relative positional relationship between the two local regions in pair and information indicating directions of crowds appended to the two local regions. The positions of crowds correspond to positions of the two local regions used for classifying the crowd type of the crowds. Hereinafter, a vector indicating relative positional relationship of two local regions is referred to as a relative vector.

Figure 4:
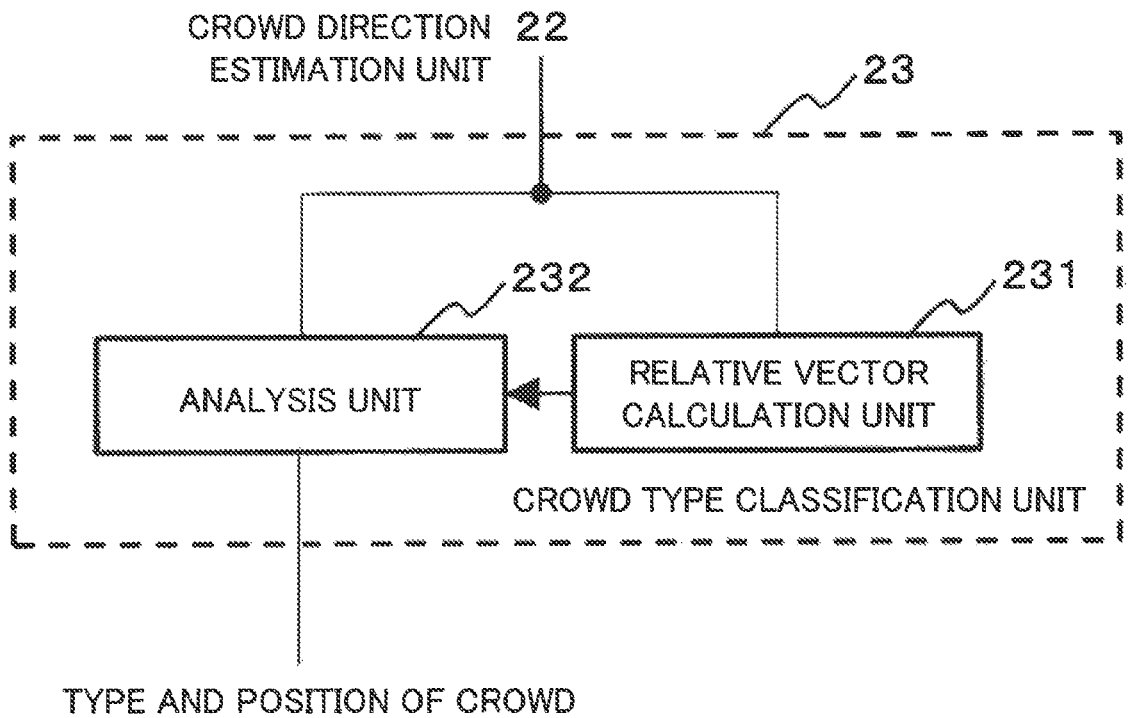
FIG. 4 is a block diagram illustrating a configuration example of a crowd type classification unit according to the first example embodiment of the present invention.

FIG. 4 is a block diagram illustrating a configuration example of the crowd type classification unit 23. The crowd type classification unit 23 includes a relative vector calculation unit 231 and an analysis unit 232.

The relative vector calculation unit 231 selects two local regions in pair. The relative vector calculation unit 231 calculates a relative vector indicating the relative positional relationship between the two local regions.

Figure 5:
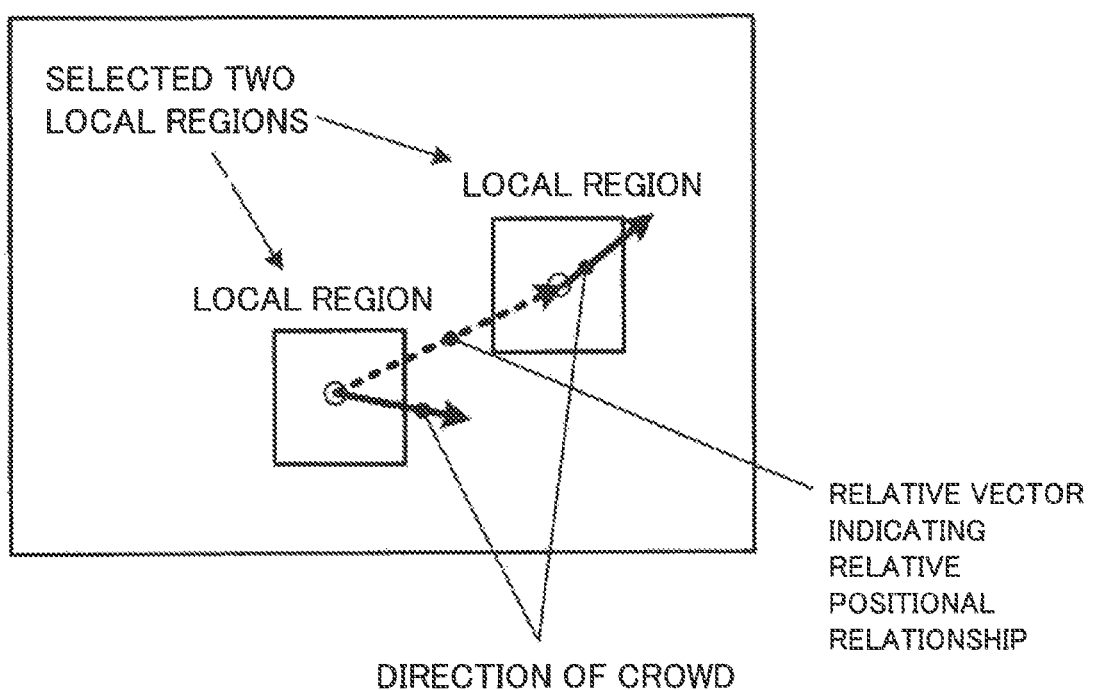
FIG. 5 is a schematic drawing of an example illustrating two selected local regions and a relative vector indicating a relative positional relationship between the two local regions.

FIG. 5 is a schematic drawing of an example illustrating selected two local regions and a relative vector indicating a relative positional relationship between the two local regions. In FIG. 5, the relative vector is represented by a dotted line. Directions of the crowds, indicated by information appended to the local regions, are represented by vectors in solid lines. Hereinafter, a direction of a crowd, indicated by information appended to a local region, is referred to as a direction of a crowd in a local region.

The analysis unit 232 classifies the crowd type of a crowd including a plurality of staying persons and determines positions of crowds by using a relative vector and information indicating directions of crowds, appended to the two local regions. For example, lining up, surrounding, and gathering are examples of the crowd type of staying crowds.

Two specific examples of a crowd type classification process of classifying a crowd type of a crowd is described below.

Figure 6:
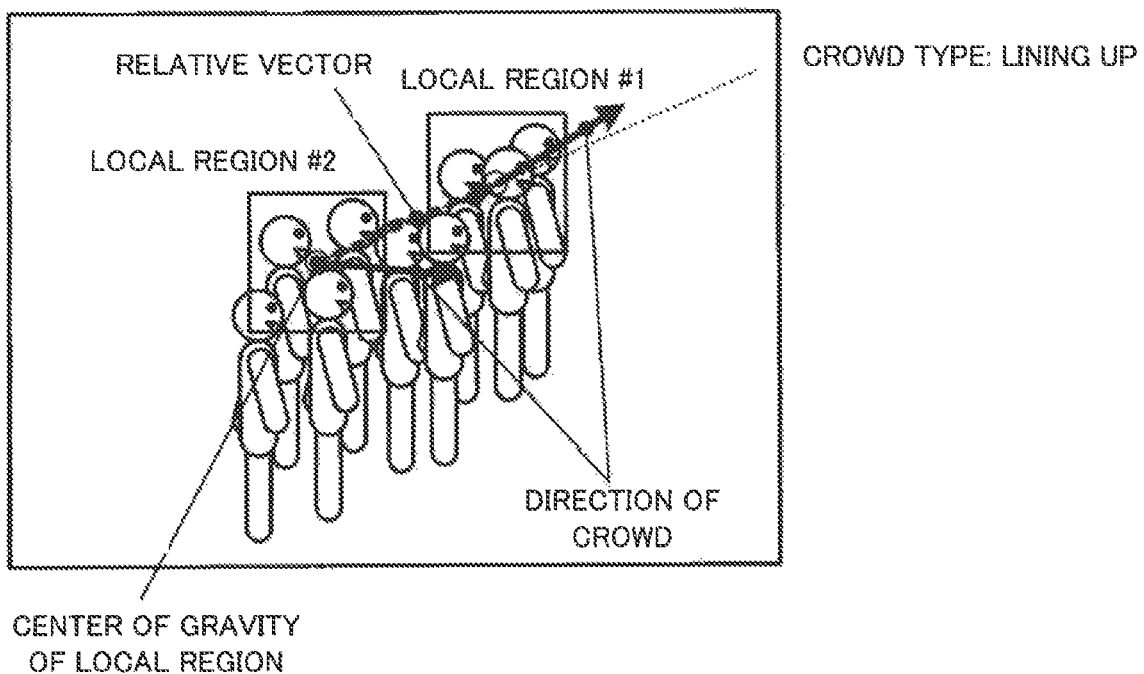
FIG. 6 is a schematic drawing illustrating two local regions each indicating crowds of a crowd type classified as "lining up".

An example of a process of classifying "lining up" is described as a first example. FIG. 6 is a schematic drawing illustrating two local regions indicating crowds whose crowd type is classified as "lining up". In FIG. 6, a relative vector is represented by a dotted line like in FIG. 5, and the directions of the crowds in the local regions are represented by vectors in solid lines.

The relative vector calculation unit 231 selects two local regions from the local regions to each of which information indicating a direction of a crowd is appended. Here, two local regions #1 and #2 illustrated in FIG. 6 are assumed to be selected. The relative vector calculation unit 231 calculates a relative vector connecting positions of centers of gravity of the selected two local regions. Here, the provided as an example is description of a relative vector having an initial point at the position of the center of gravity of the local region #2 and a terminal point at the position of the center of gravity of the local region #1. However, in the processing of classifying "lining up", as described later, the relative vector calculation unit 231 calculates, from two local regions, two relative vectors whose directions are opposite from each other, and the analysis unit 232 performs processing for the two relative vectors.

The relative vector calculation unit 231 determines whether or not the magnitude of the relative vector derived from the two local regions is equal to or smaller than a predetermined threshold value. When the magnitude of the relative vector is larger than the predetermined threshold value (in other words, when the two local regions are far from each other), the analysis unit 232 stops processing for these two local regions, and the relative vector calculation unit 231 newly selects two local regions.

When the magnitude of the relative vector is equal to or smaller than the predetermined threshold value (in other words, when the two local regions are close to each other), the analysis unit 232 classifies the crowd type of the crowds (i.e. the staying crowd) relating to the two local regions by using the directions of the crowds of the selected two local regions and the relative vector.

The analysis unit 232 calculates similarity between the direction of the crowd of the local region #1 and the direction of the relative vector. The analysis unit 232 calculates similarity between the direction of the crowd of the local region #2 and the direction of the crowd of the relative vector. The analysis unit 232 calculates similarity between the direction of the crowd of the local region #1 and the direction of the crowd of the local region #2.

When all these three kinds of similarity are larger than the predetermined value, the analysis unit 232 classifies the crowd type of the two local regions to be "lining up". The similarity described above may be any value that indicates a degree of similarity between directions, irrespective of the method of calculation. An inner product may be used to obtain the similarity between directions. Specifically, the analysis unit 232 may normalize vectors indicating directions, and may calculate an inner product of the normalized two vectors as the similarity between the directions indicated by the two vectors.

The analysis unit 232 calculates a relative vector having an initial point at the position of the center of gravity of the local region #2 and a terminal point at the position of the center of gravity of the local region #1, and a relative vector in the opposite direction (in other words, a relative vector having an initial position at the position of center of gravity of the local region #1 and a terminal point at the position of center of gravity of the local region #2). The described above is a case where the analysis unit 232 focuses on the former relative vector and calculates above-described three kinds of similarity by focusing on the former relative vector. The analysis unit 232 calculates the above-described three kinds of similarity not only in the case of focusing on the former relative vector, but also in the case of focusing the latter relative vector. When all these three kinds of similarity are larger than the predetermined value, the analysis unit 232 classifies the crowd type of the two local regions to be "lining up".

When the analysis unit 232 classifies the crowd type in the two local regions to be "lining up" in at least one of the case of focusing on one of the two relative vectors having directions opposite to each other and the case of focusing on the other of the two relative vectors, the analysis unit 232 may determine the crowd type of the two local regions to be "lining up".

In the example illustrated in FIG. 6, the analysis unit 232 focuses on a relative vector having an initial point at the position of the center of gravity of the local region #2 and a terminal point at the position of the center of gravity of the local region #1, and classifies the crowd type of the two local regions to be "lining up". Therefore, even though the analysis unit 232 fails to classify the crowd type of the two local regions to be "lining up" when focusing on a relative vector having a direction opposite to that of the relative vector illustrated in FIG. 6, the analysis unit 232 may determine the crowd type of the two local regions illustrated in FIG. 6 as "lining up".

Figure 7:
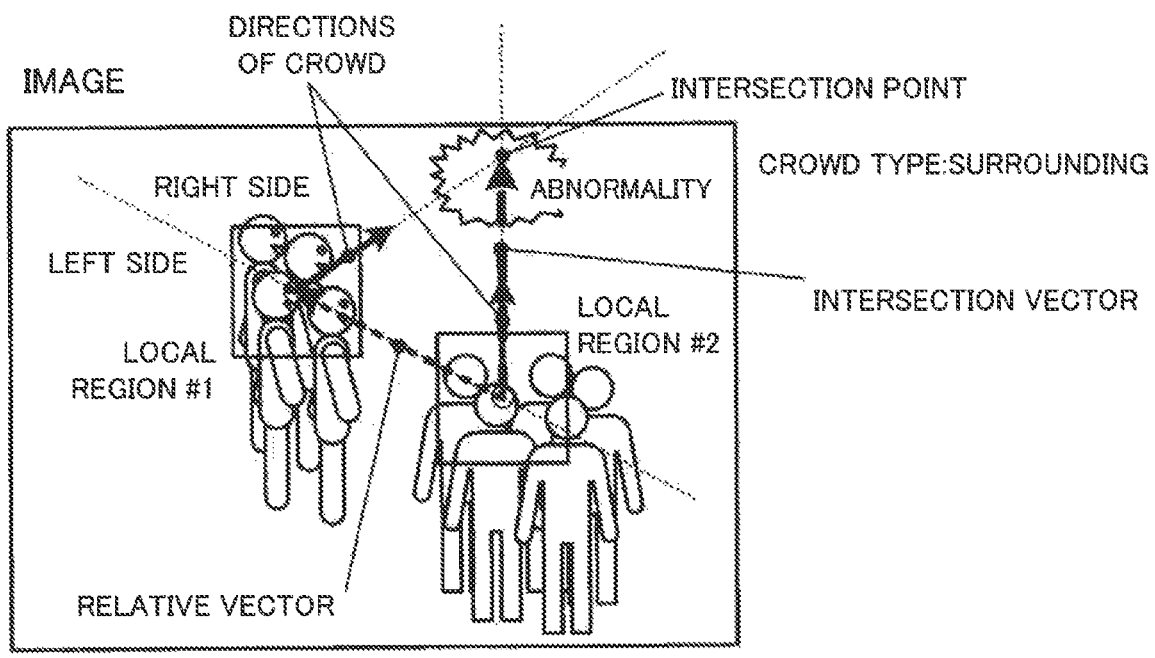
FIG. 7 is a schematic drawing illustrating two local regions each indicating crowds of a crowd type classified as "surrounding".

An example of processing of classifying "surrounding" is described as a second example. FIG. 7 is a schematic drawing illustrating two local regions in which the crowd type of the crowd included in the image is classified as "surrounding". In FIG. 7, the relative vector is represented by a dotted line like in FIG. 5, and the directions of the crowds in the local regions are represented by vectors in solid lines.

The relative vector calculation unit 231 selects two local regions from the local regions to each of which information indicating a direction of the crowd is appended. Here the following description is described on assumption that two local regions #1 and #2 illustrated in FIG. 7 are selected. The relative vector calculation unit 231 calculates a relative vector connecting positions of centers of gravity of the selected two local regions. In the processing of classifying "surrounding", the relative vector calculation unit 231 does not have to calculate the two relative vectors having directions opposite to each other for the two local regions. The relative vector calculation unit 231 may calculate only one relative vector for the two local regions. Although two directions are possible as a direction of a relative vector, the relative vector calculation unit 231 may calculate only the relative vector having either one of the directions. Any one of the two directions of the relative vector may be selected. In FIG. 7, an example of a relative vector having an initial point at the position of the center of gravity of the local region #2 and a terminal point at the position of the center of gravity of the local region #1 is illustrated.

The relative vector calculation unit 231 determines whether or not the magnitude of the relative vector derived for the two local regions is equal to or smaller than a predetermined threshold value. When the magnitude of the relative vector is larger than the predetermined threshold value, the analysis unit 232 stops processing for these two local regions, and the relative vector calculation unit 231 selects two new local regions. When the magnitude of the relative vector is equal to or smaller than the predetermined threshold value (in other words, when the two local regions are close to each other), the analysis unit 232 classifies the crowd type of the crowd (the staying crowds) of the two local regions by using the directions of the crowds in the selected two local regions and the relative vector. In this point, that is similar to the case of the processing of classifying "lining up".

The analysis unit 232 calculates a cross product (hereinafter, referred to as a first cross product) of the relative vector and the vector in the direction of the crowd in the local region #1. In the same manner, the analysis unit 232 calculates a cross product (hereinafter, referred to as a second cross product) of the relative vector and the vector in the direction of the crowd in the local region #2.

The analysis unit 232 derives an intersection point of a straight line extending along the direction of the crowd of the local region #1 and a straight line extending along the direction of the crowd of the local region #2. The analysis unit 232 calculates a vector having a terminal point at the intersection point and an initial point at the position of the center of gravity of either one (no matter which) of the two local regions. For the sake of convenience, such a vector is referred to as an intersection point vector. In FIG. 7, the intersection point vector is indicated by a broken line. In the example illustrated in FIG. 7, the position of the center of gravity of the local region #2 is an initial point of the intersection point vector. The analysis unit 232 calculates a cross product (hereinafter, referred to as a third cross product) of the relative vector and the intersection point vector.

The image illustrated in FIG. 7 (images including the two local regions) has two directions that are vertical thereto. The first cross product, the second cross product, and the third cross product described above are directed in either one of the two directions vertical to the image. The analysis unit 232 classifies the crowd type of the two local regions to be "surrounding" when the first cross product, the second cross product, and the third cross product are directed in the same direction.

The sameness of the direction of the first cross product and the direction of the second cross product means that the direction of the crowd in the local region #1 and the direction of the crowd in the local region #2 are directed in directions on the same side with respect to a straight line extending along the relative vector. The first cross product, the second cross product, and the third cross product are directed in the same direction means that the above-described intersection point existing in the direction of the crowd in the local region #1 and in the direction of the crowd in the local region #2. Therefore, when the first cross product, the second cross product, and the third cross product are directed in the same direction, the crowds in the local regions #1 and #2 face toward the intersection point and the crowd type may be "surrounding".

The analysis unit 232 may classify surrounding by a method other than the method described above. The directions of the crowds in the two local regions #1 and #2 also indicate an abnormality spot and a focused spot.

The two specific examples of classification are described above. The crowd type classification unit 23 may classify a crowed type other than the crowd types described above by using a relative vector of a combination of two local regions and direction of the crowds for the two local regions.

The crowd type classification unit 23 may execute processing of classifying a plurality of different crowd types separately.

The staying crowd detection unit 21 including the staying state estimation unit 211, the number-of-persons estimation unit 212 and the local region detection unit 213, the crowd direction estimation unit 22 including the direction estimation unit 221 and the data append unit 222, and the crowd type classification unit 23 including the relative vector calculation unit 231 and the analysis unit 232 are achieved by, for example, a processor such as a Central Processing Unit (CPU) of a computer. In this case, the CPU may read a crowd type classification program from a program storage medium such as a program storage device (not illustrated) of the computer, and may operate as the staying crowd detection unit 21, the crowd direction estimation unit 22, and the crowd type classification unit 23 according to the program.

Figure 8:
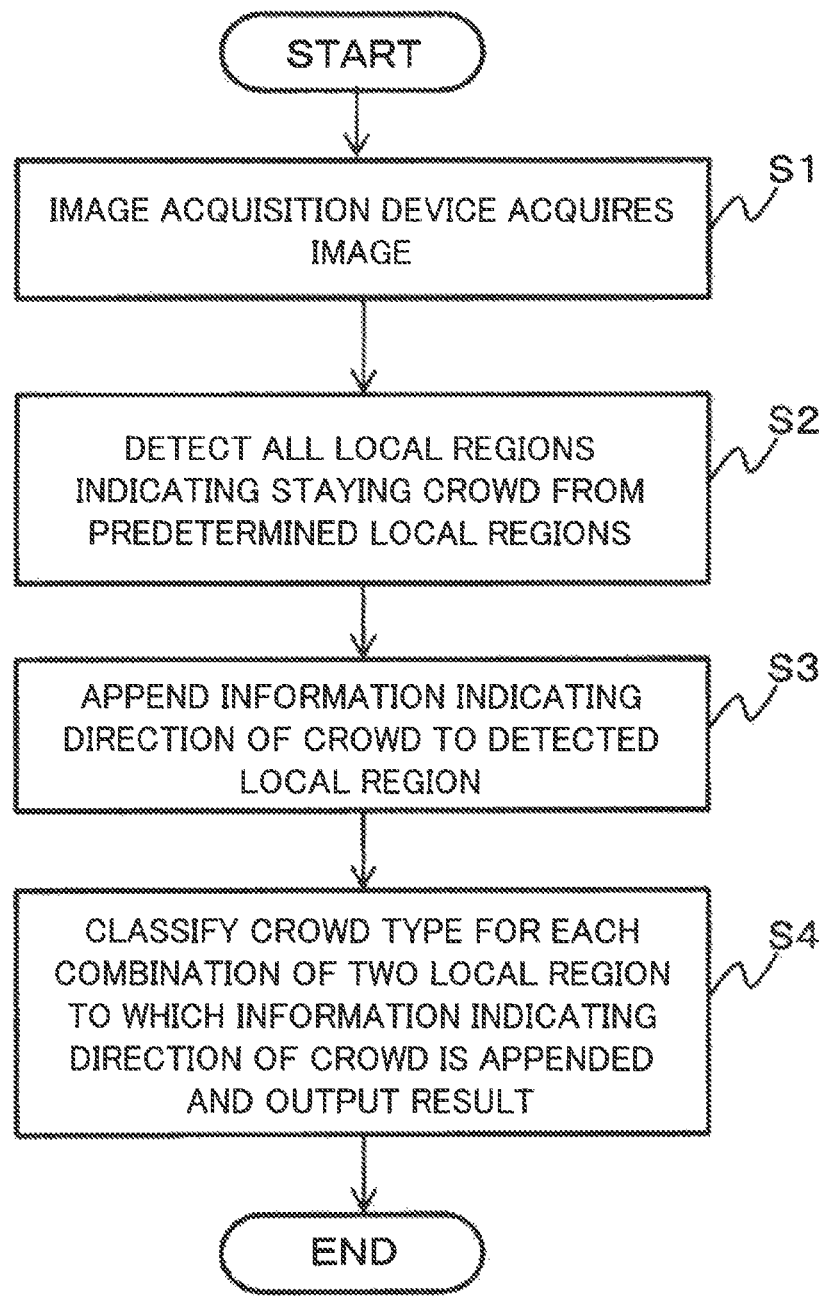
FIG. 8 is a flowchart illustrating an example of operation of the crowd type classification system according to the first example embodiment of the present invention.

A process of processing is described below. FIG. 8 is a flowchart illustrating an example of a process of processing according to the first example embodiment of the present invention.

The image acquisition device 1 acquires images from an output from an imaging device such as a camera or from a video device such as video equipment (Step S1).

When a method using local region images that are of the same place and are acquired at different times is adopted as a method of estimating a staying degree of objects for the staying state estimation unit 211, the image acquisition device 1 may acquire two different images that are of the same place and are taken at different times. The image acquisition device 1 may store an image taken at a certain time in advance and acquire, in Step S1, one image taken at a time that is different from the certain time. When using a motion sensor is adopted as a method of estimating a staying degree of objects for the staying state estimation unit 211, the image acquisition device 1 may acquire one image in Step S1.

After Step S1, the staying crowd detection unit 21 estimates the staying degree of objects and the number of persons in a local region for each of the local region images determined based on the predetermined local regions in the image acquired in Step S1. The staying crowd detection unit 21 detects a local region indicating a staying crowd from the local regions on the basis of the estimated values of staying degree of objects and the numbers of persons in the local regions (Step S2).

Figure 9:
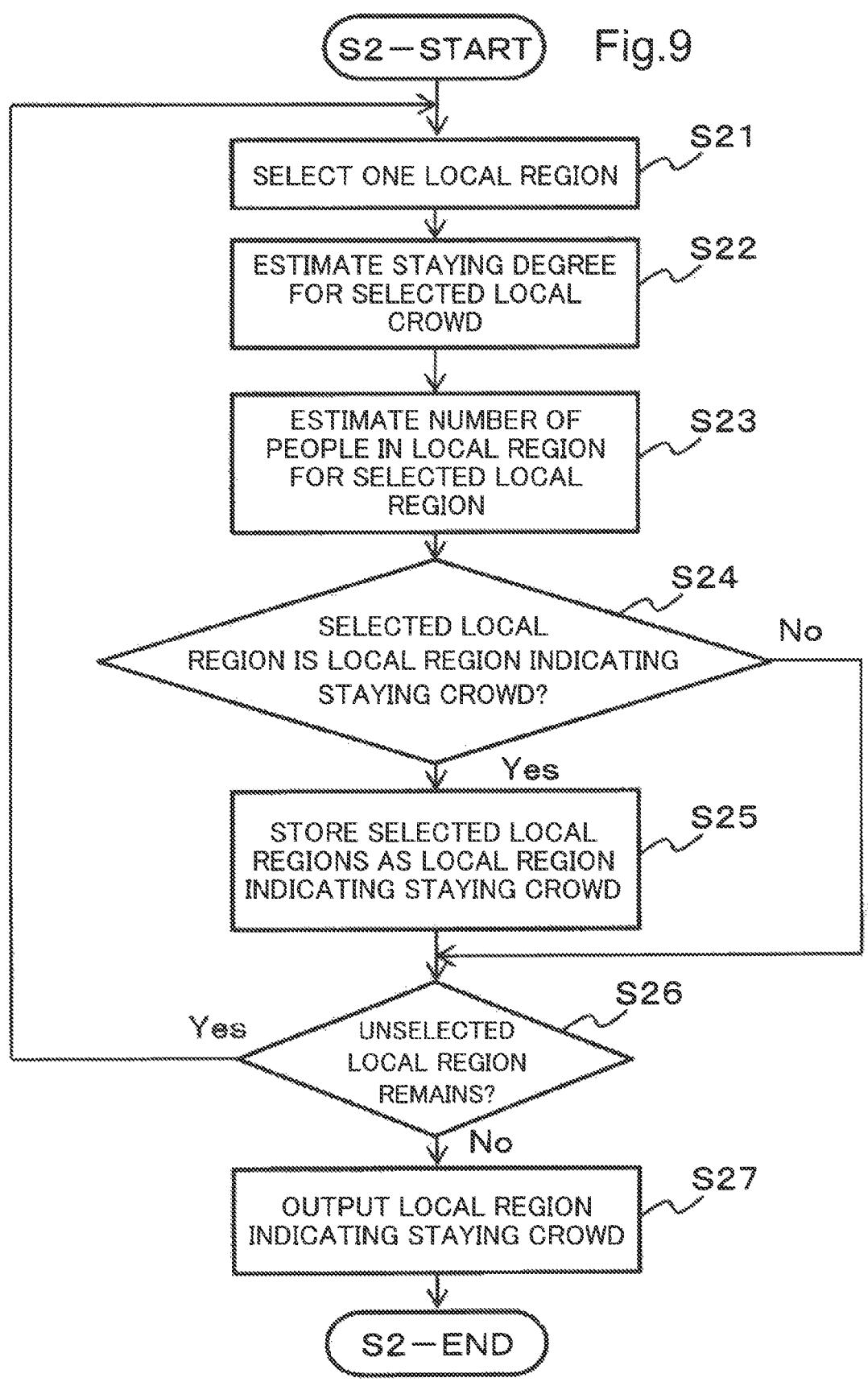
FIG. 9 is a flowchart illustrating an example of an operation in Step S2 of the crowd type classification system according to the first example embodiment of the present invention.

FIG. 9 is a flowchart indicating an example of a process of processing in Step S2.

The staying state estimation unit 211 selects one unselected local region from predetermined local regions (Step S21). Each of the local regions is represented by a position and a size of a local region stored in the local region group storage unit 31. Although Steps S21 and S26 may be performed by the number-of-persons estimation unit 212, a case where the staying state estimation unit 211 performs Steps S21 and S26 is described below.

The staying state estimation unit 211 estimates the staying degree of objects in the local region image specified in the image (the image acquired in Step S1) by the local region selected in Step S21 (Step S22). The example of the method of estimating a staying degree of objects is described above and thus is not described here.

Next, The number-of-persons estimation unit 212 estimates the number of persons in the local region images specified in the image (the image acquired in Step S1) by the local region selected in Step S21 (Step S23). The example of the method of estimating the number of persons is described above and thus is not described here.

Either Step S22 or Step S23 may be performed first.

Next, the local region detection unit 213 determines whether or not the selected local region is a local region indicating a staying crowd by using the staying degree of objects, which is estimated in Step S22, and the number of persons in the local region, which is estimated in Step S23 (Step S24). When the result of determining is that the selected local region is determined to be local region indicating the staying crowd, the result means that the local region detection unit 213 detects the selected local region as a local region indicating a staying crowd.

When the conditions that the staying degree of objects is larger than a predetermined threshold value and the number of persons in the local region is larger than the predetermined threshold value are satisfied, the local region detection unit 213 determines the selected local region to be a local region indicating a staying crowd. When the above-described conditions are not satisfied, the local region detection unit 213 determines the selected local region not to be a local region indicating a staying crowd.

When the selected local region is a local region indicating a staying crowd (Yes in Step S24), the local region detection unit 213 stores the selected local region as the local region indicating the staying crowd (Step S25). After Step S25, the procedure transfers to Step S26.

When the selected local region is not a local region indicating a staying crowd (No in Step S24), the procedure transfers to Step S26 without performing processing in Step S25.

In Step S26, the staying state estimation unit 211 determines whether any unselected local region remains (Step S26). When an unselected local region remains (Yes in Step S26), the staying crowd detection unit 21 repeats the operations from Step S21.

When no unselected local region remains (No in Step S26), the local region detection unit 213 outputs each local region indicating a staying crowd (that is, each local region stored in Step S25) to the crowd direction estimation unit 22 (Step S27). When Step S27 is performed, Step S2 (see FIG. 8) is completed.

Next, the crowd direction estimation unit 22 estimates a direction of a crowd in a local region image of a local region for each local region indicating a staying crowd, and appends information indicating the direction of the crowd to the local region (Step S3).

Specifically, the direction estimation unit 221 selects a local region from the local regions each indicating staying crowds, and estimates the direction of the crowd in the local region image of the selected local region. The data append unit 222 then appends information indicating the estimated direction of the crowd to the selected local region. The direction estimation unit 221 and the data append unit 222 may perform the above-described processes until no more unselected local region remains. The data append unit 222 outputs, to the crowd type classification unit 23, each local region to which the information indicating the estimated directions of the crowd is appended.

The crowd type classification unit 23 then classifies the crowd type of the staying crowd for each local region combination including two local regions to each of which information indicating a direction of a crowd is appended by using the relative vector and the directions of the crowd of the two local regions. The crowd type classification unit 23 specifies the position of the crowd. The crowd type classification unit 23 outputs the crowd type of the crowd and the position of the crowd (Step S4). The crowd type of staying crowds may be, for example, lining up, surrounding, gathering or the like. In Step S4, the crowd type classification unit 23 may perform processing of classifying for one crowd type, or may perform processing of classifying for a plurality of different crowd types.

Figure 10:
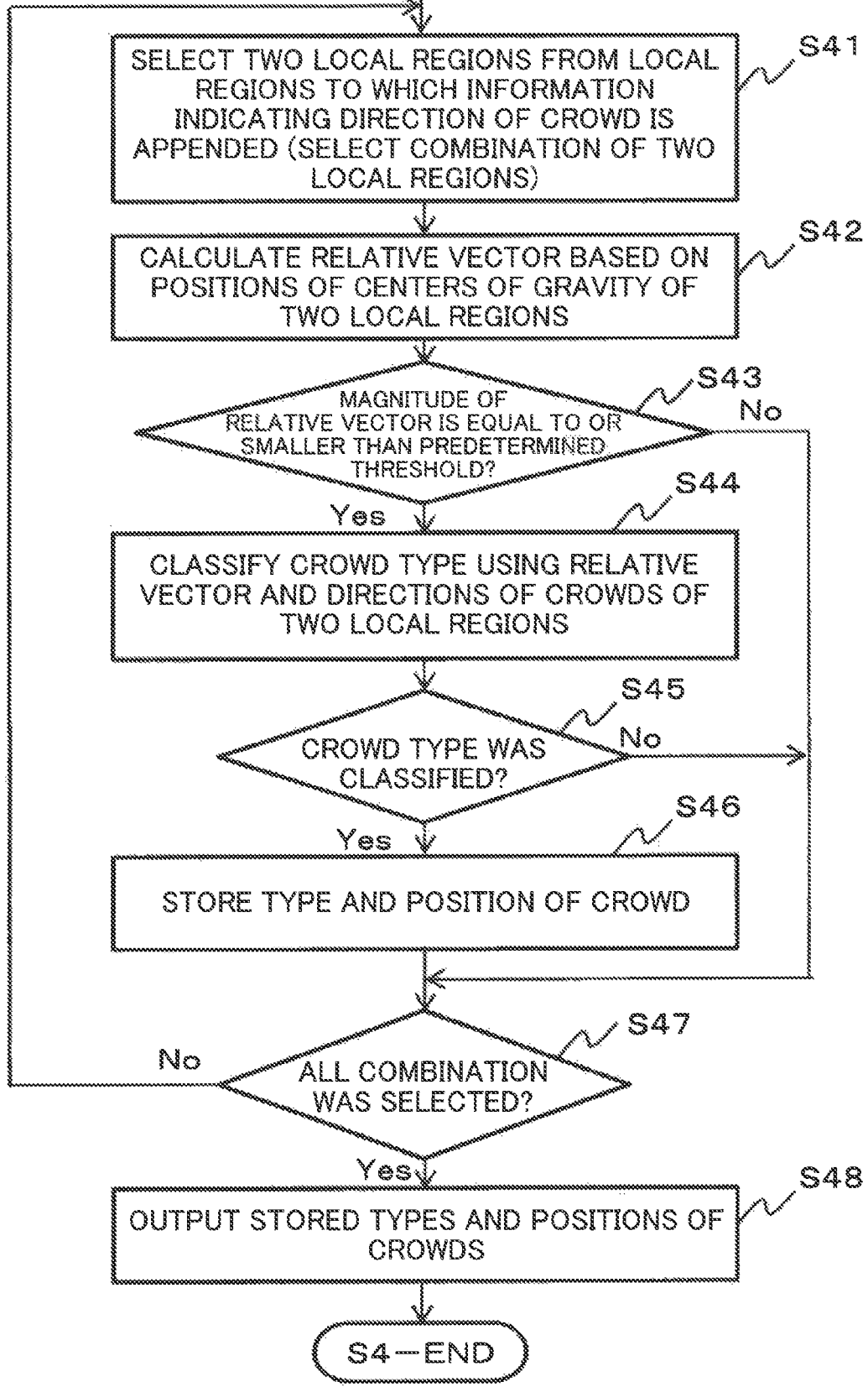
FIG. 10 is a flowchart illustrating an example of an operation in Step S4 of the crowd type classification system according to the first example embodiment of the present invention.

FIG. 10 is a flowchart indicating an example of a process of processing in Step S4.

The relative vector calculation unit 231 selects two local regions from local regions to which the information indicating a direction of a crowd is appended (Step S41). Step S41 may be considered to be a process of selecting one combination including two local regions to each of which information indicating a direction of a crowd is appended. In Step S41, the relative vector calculation unit 231 selects one unselected combination.

The relative vector calculation unit 231 calculates a relative vector connecting positions of centers of gravity of the two local regions selected in Step S41 (Step S42). The mode of calculating the relative vector may vary depending on the crowd type that is the target of the processing of classifying. For example, when the crowd type to be subjected to the classification process is "lining up", the relative vector calculation unit 231 calculates the two relative vectors having directions opposite to each other. When the crowd type that is the target of the processing of classifying is, for example, "surrounding", the relative vector calculation unit 231 may calculate one relative vector having an initial point at the position of the center of gravity of any one of the two local regions and a terminal point at the position of the center of gravity of the other of the two local regions.

Next, the relative vector calculation unit 231 determines whether or not the magnitude of the relative vector calculated in Step S42 is equal to or smaller than a predetermined threshold value (Step S43).

When the magnitude of the relative vector is larger than the predetermined threshold value (No in Step S43), the procedure transfers to Step S47.

When the magnitude of the relative vector is equal to or smaller than the predetermined threshold value (Yes in Step S43), the analysis unit 232 classifies the crowd type of the staying crowd by using the relative vector and the directions of the crowds in the selected two local regions (Step S44).

In Step S44, the analysis unit 232 may perform the processing of classifying for one crowd type, or may perform the processing of classifying for a plurality of different crowd types. For example, in Step S44, the analysis unit 232 may perform the processing of classifying only for "lining up", or may perform the processing of classification for "lining up" and the processing of classification for "surrounding". Although "lining up" and "surrounding" are exemplified here, the analysis unit 232 may perform the processing of classifying for another crowd type in Step S44.

The specific example of processing of classifying the crowd type by using the relative vector and the directions of the crowds in the two local regions is described above using the case of classifying "lining up" and the case of classifying "surrounding" as examples. Therefore, overlapped description is omitted here.

When no crowd type is classified in Step S44 (No in Step S45), the procedure transfers to Step S47.

When at least one crowd type is classified in Step S44 (Yes in Step S45), the analysis unit 232 stores the crowd type and the position of the crowd concerned (Step S46). The analysis unit 232 may store the positions of the two local regions used for classify the crowd type as the position of the crowd. After Step S46, the procedure transfers to Step S47.

In Step S47, the relative vector calculation unit 231 determines whether to complete selection of each combination including two local regions to which the information indicating a direction of a crowd is appended (Step S47). When an unselected combination remains (No in Step S47), the crowd type classification unit 23 repeats the operation from Step S41.

When no unselected combination remains (Yes in Step S47), the analysis unit 232 outputs a stored crowd type and the position of the crowd (Step S48). The output mode in Step S48 is not specifically limited. For example, the analysis unit 232 may output the crowd types and positions by display or may output in other modes. When Step S48 is performed, Step S4 (see FIG. 8) is completed.

According to the first example embodiment of the present invention, the crowd type classification unit 23 selects, from local regions each indicating staying crowds, local region combinations each of which includes two local regions one by one. The crowd type classification unit 23 classifies the crowd type for the two local regions included in the selected combination by using a relative vector and directions of the crowds of the two local regions. Therefore, various types can be classified as the crowd type of the staying crowds included in the image.

In the present example embodiment, a plurality of local regions are determined in advance. When the crowd type classification unit 23 (more specifically, the analysis unit 232) classifies the crowd type for the two local regions included in the selected combination, the analysis unit 232 determines the positions of the two local regions in the image as the positions where the crowd presents. Therefore, the positions of the crowds whose crowd type in the image is classified may be specified.

The local-region-based learning may be applied to leaning for estimating the staying degree of objects, learning for estimating the number of persons in the local region, and learning for estimating the direction of the crowd. The learning may be performed by using an image pattern including an occlusion between persons. In this case, even when the persons are occluded between them in the image acquired by the image acquisition device 1, the crowd type of the staying crowd can be classified robustly.

Figure 11:
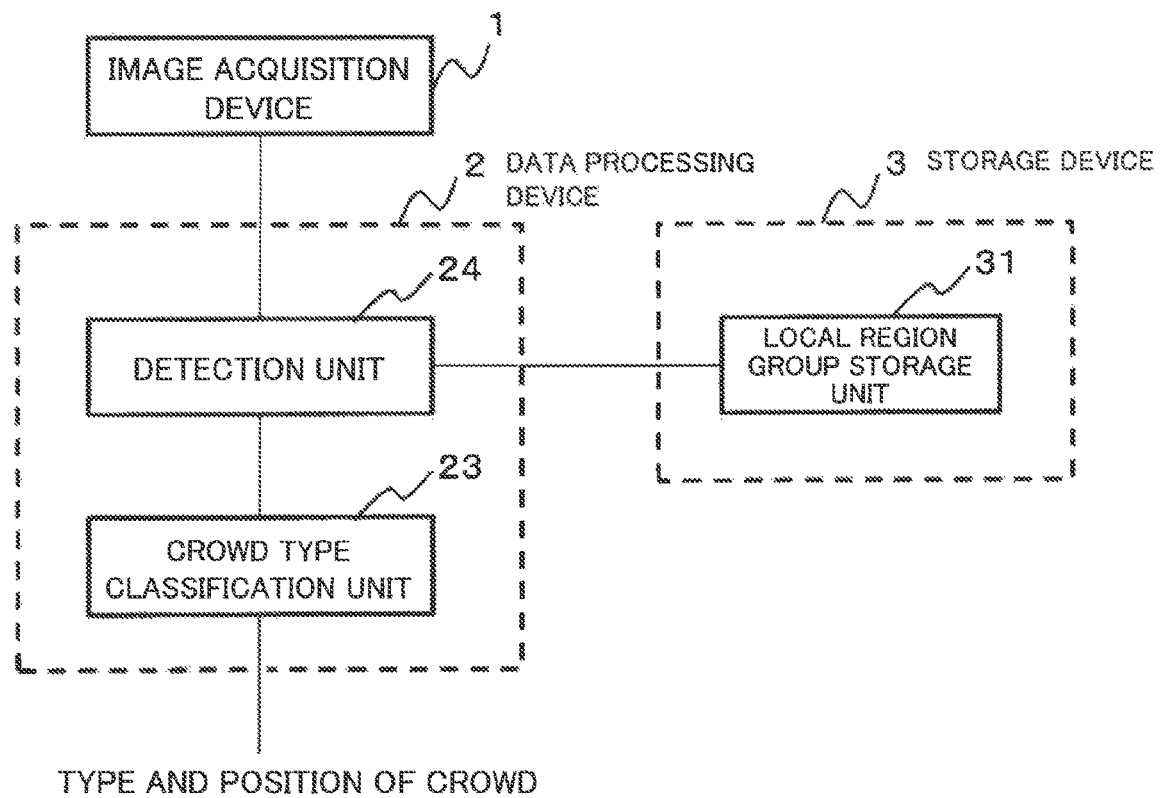
FIG. 11 is a block diagram illustrating a modification example of the first example embodiment.

Next, a modification of the first example embodiment is described. FIG. 11 is a block diagram illustrating a modification of the first example embodiment. Description of the same components as the components illustrated in FIG. 1 is omitted.

In the first example embodiment described above, the staying crowd detection unit 21 (see FIG. 1) estimates the staying degree of objects in the local regions and the numbers of persons in the local regions, and detects a local region indicating a staying crowd. Then, the crowd direction estimation unit 22 (see FIG. 1) estimates the direction of the crowd of the detected local region.

Meanwhile, the crowd type classification system illustrated in FIG. 11 estimates, for each of the local regions determined in advance, the staying degree of objects, the number of persons in a local region, and the direction of the crowd at the same time. Specifically, the crowd type classification system illustrated in FIG. 11 includes a detection unit 24 instead of the staying crowd detection unit 21 and the crowd direction estimation unit 22 illustrated in FIG. 1. The detection unit 24 estimates, for each of the local regions determined in advance, the staying degree of objects, the number of persons in a local region, and the direction of the crowd at the same time.

For example, an estimator may be acquired in advance by learning so that the estimator outputs, upon reception of an input of a local region image, the staying degree of objects, the number of persons in the local region, and the direction of the crowd. The detection unit 24 may input a local region image to the estimator, and thereby obtain estimated results of the staying degree of objects, the number of persons in the local region, and the direction of the crowd simultaneously. The technology described in PTL 4 may be used for the learning of the estimator described above.

The detection unit 24 is achieved by, for example, a CPU of a computer which operates according to the crowd type classification program.

Second Example Embodiment

A crowd type classification system according to a second example embodiment of the present invention may be represented by a block diagram illustrated in FIG. 1 similarly to the crowd type classification system of the first example embodiment, and thus the second example embodiment is described with reference to FIG. 1.

A staying crowd detection unit 21 and a crowd type classification unit 23 are similar to the staying crowd detection unit 21 and the crowd type classification unit 23 in the first example embodiment, and thus description thereof is omitted.

The crowd direction estimation unit 22 estimates a direction of a crowd in a local region image of a local region detected by the staying crowd detection unit 21, and appends information indicating the direction of the crowd to the local region when determining the reliability of the direction of the crowd to be high. In contrast, when determining the reliability of the direction of the crowd to be low, the crowd direction estimation unit 22 does not append the information indicating the direction of the crowd, and excludes the local region from a target of processing of classifying a crowd type.

The crowd direction estimation unit 22 in the second example embodiment includes a direction estimation unit 221 and a data append unit 222 as illustrated in FIG. 3.

The direction estimation unit 221 in the second example embodiment estimates the direction of the crowd in the local region image of the local region detected by the staying crowd detection unit 21. In this point, that is similar to the first example embodiment. However, the direction estimation unit 221 of the second example embodiment estimates the direction of the crowd in a mode allowing determination of reliability of the direction of the crowd by the alternative of high or low.

For example, in the second example embodiment, an estimator is acquired in advance by regression learning so that the estimator outputs, upon reception of an input of a local region image, a vector which indicates the direction of the crowd and whose magnitude indicates a degree of reliability in the direction as the direction of the crowd of the local region image. The direction estimation unit 221 inputs a local region images into the estimator, and thereby estimates the direction of the crowd. The result of estimation of the direction of the crowd is acquired as the above-described vector, and thus the reliability of the direction of the crowd can be determined by the alternative of high or low. In this case, when the magnitude of the vector indicating the direction of the crowd is equal to or larger than a predetermined threshold value, the data append unit 222 may determine the reliability of the estimated direction of the crowd to be high and append information (i.e. information represented by the vector in this example) indicating the direction of the crowd to the local region. When the magnitude of the vector indicating the direction of the crowd is smaller than the predetermined threshold value, the data append unit 222 determines the reliability of the estimated direction of the crowd to be low and does not append the information, corresponding to the estimated result, indicating the direction of the crowd to the local region. The data append unit 222 excludes the local region to which information indicating a direction of a crowd is not appended from the target of processing of the crowd type classification unit 23.

For example, an estimator may be acquired in advance by regression learning so that the estimator outputs, upon reception of an input of a local region image, an angle indicating the direction of the crowd as the direction of the crowd in the local region image. The direction estimation unit 221 inputs a local region image into the estimator, and thereby estimates the direction of the crowd. The result of estimation of the direction of the crowd is represented by the angle, and thus the reliability of the direction of the crowd can be determined by the alternative of high or low. For example, when the angle indicating the direction of the crowd falls within a range from 0 to 360, the data append unit 222 may determine the reliability of the estimated direction of the crowd to be high and append information (i.e. information represented by angle in this example) indicating direction of the crowd to the local region. When the angle indicating the direction of the crowd falls outside the range from 0 to 360, the data append unit 222 determines the reliability of the estimated direction of the crowd to be low and does not append the information, corresponding to the estimated result, indicating the direction of the crowd to the local region. The data append unit 222 excludes the local regions to which information indicating a direction of a crowd is appended from the target of processing of the crowd type classification unit 23.

For example, an estimator may be acquired in advance by classification learning so that the estimator outputs, upon reception of an input of a local region image, probabilities that an angle indicating the direction of the crowd corresponds to angles at every predetermined angle (for example, at every 10 degrees) as the direction of the crowd in the local region image. The direction estimation unit 221 inputs the local region image into the estimator, and thereby obtains a probability of each of the angles at every predetermined angle. The direction estimation unit 221 estimates that an angle of the highest probability is the direction of the crowd.

When the probability is high at the angle estimated as the direction of the crowd and low at other angles, the data append unit 222 may determine the reliability of the estimated direction of the crowd to be high and append information (i.e. information represented by angle in this example) indicating the direction of the crowd to the local region. When the probability is on the same level at any of the angles, the data append unit 222 determines the reliability of the estimated direction of the crowd to be low and does not append the information indicating the direction of the crowd to the local region for which the estimated result is calculated. The data append unit 222 excludes the local regions to which information indicating a direction of a crowd is not appended from the target of processing of the crowd type classification unit 23.

The reliability of the direction of the crowd is not limited to the example described above. The reliability of the direction of the crowd may be indicated by any mode which allows determination of reliability by the alternative of high or low.

The process of processing in the second example embodiment may be shown in the flowchart in FIG. 8. Steps S1, S2, and S4 are similar to Steps S1, S2, and S4 in the first example embodiment, and thus description thereof is omitted.

Figure 12:
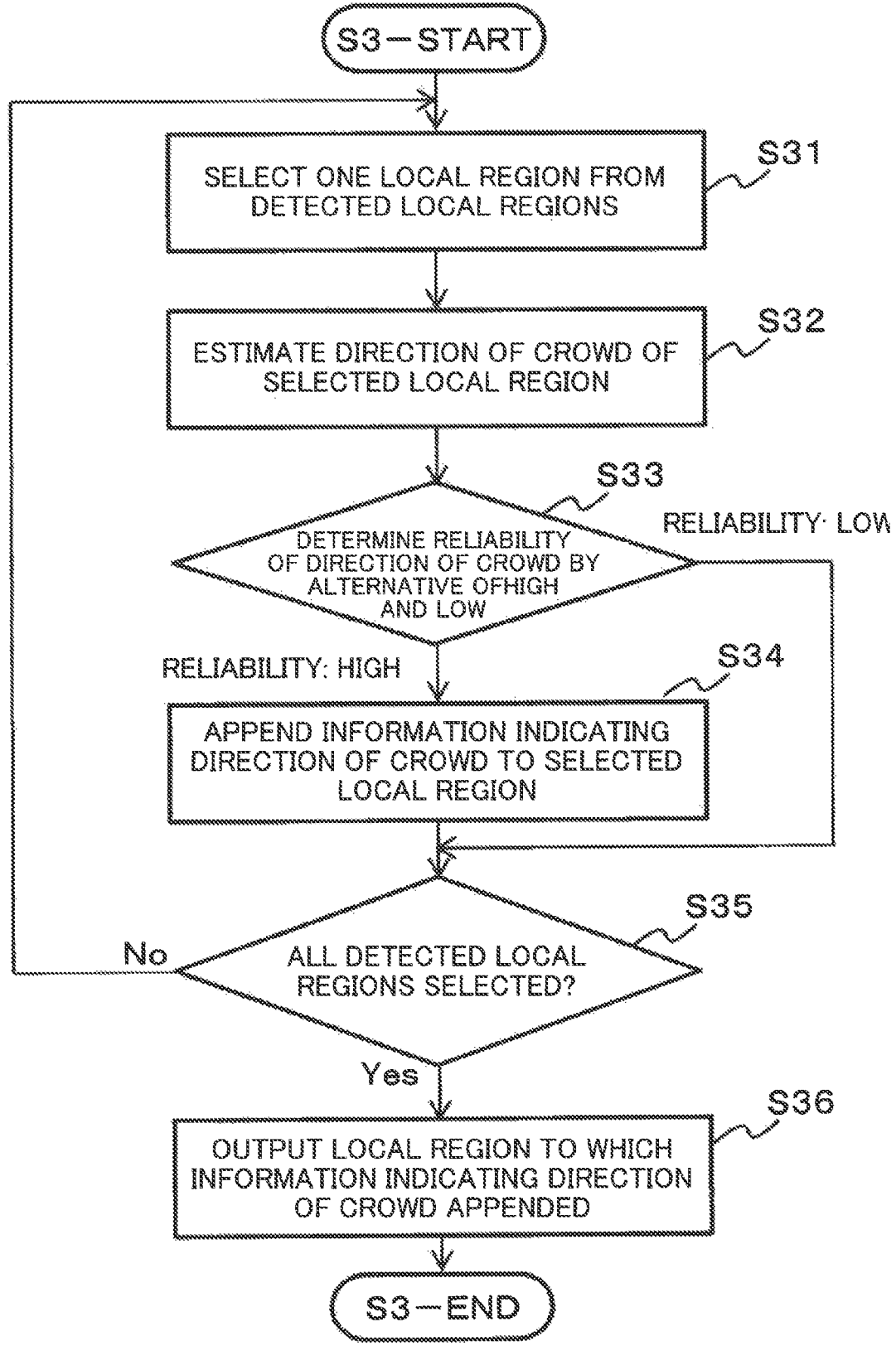
FIG. 12 is a flowchart illustrating an example of a process of processing in Step S3 of a second example embodiment.

FIG. 12 is a flowchart illustrating an example of a process of processing in Step S3 of the second example embodiment.

The direction estimation unit 221 selects one of unselected local regions from the local regions (that is, the local regions output by the staying crowd detection unit 21 in Step S2) showing the staying crowd (Step S31).

Next, the direction estimation unit 221 estimates a direction of a crowd in the local region image of the local region selected in Step S31 (Step S32). The direction estimation unit 221 estimates the direction of the crowd in a mode by which reliability of the direction of the crowd can be determined by the alternative of high or low. The specific example of estimation of the direction of the crowd of the present example embodiment is described above and thus is not described here.

The data append unit 222 determines the reliability of the direction of the crowd estimated in Step S32 by the alternative of high or low (Step S33). The specific example of determination of the reliability of the direction of the crowd by high and low is described above and thus is not described here.

When the data append unit 222 determines the reliability to be low, the procedure transfers to Step S35 without performing Step S34.

When the data append unit 222 determines the reliability to be high, the data append unit 222 appends information indicating the estimated direction of the crowd to the local region selected in Step S31 (Step S34). After Step S34, the procedure transfers to Step S35.

In Step S35, the direction estimation unit 221 determines whether to have completed selection of each of the local regions indicating the staying crowds (i.e. each of the local regions output by the staying crowd detection unit 21 in Step S2) (Step S35).

When an unselected local region remains in the local regions indicating the staying crowd (No in Step S35), the crowd direction estimation unit 22 repeats the processes from Step S31.

When selection of each of the local regions indicating the staying crowd is completed (Yes in Step S35), the data append unit 222 outputs, to the crowd type classification unit 23, each local region to which the information indicating an estimated direction of a crowd is appended (Step S36). When Step S36 is performed, Step S3 (see FIG. 8) is completed.

In the second example embodiment, the advantageous effects similar to that of the first example embodiment is achieved. In the second example embodiment, processing of classifying the crowd type is performed only for the local regions whose reliability of the estimated direction of the crowd is high. Therefore, an improvement in accuracy of classification of the crowd type of staying crowds is achieved.

Third Example Embodiment

Figure 13:
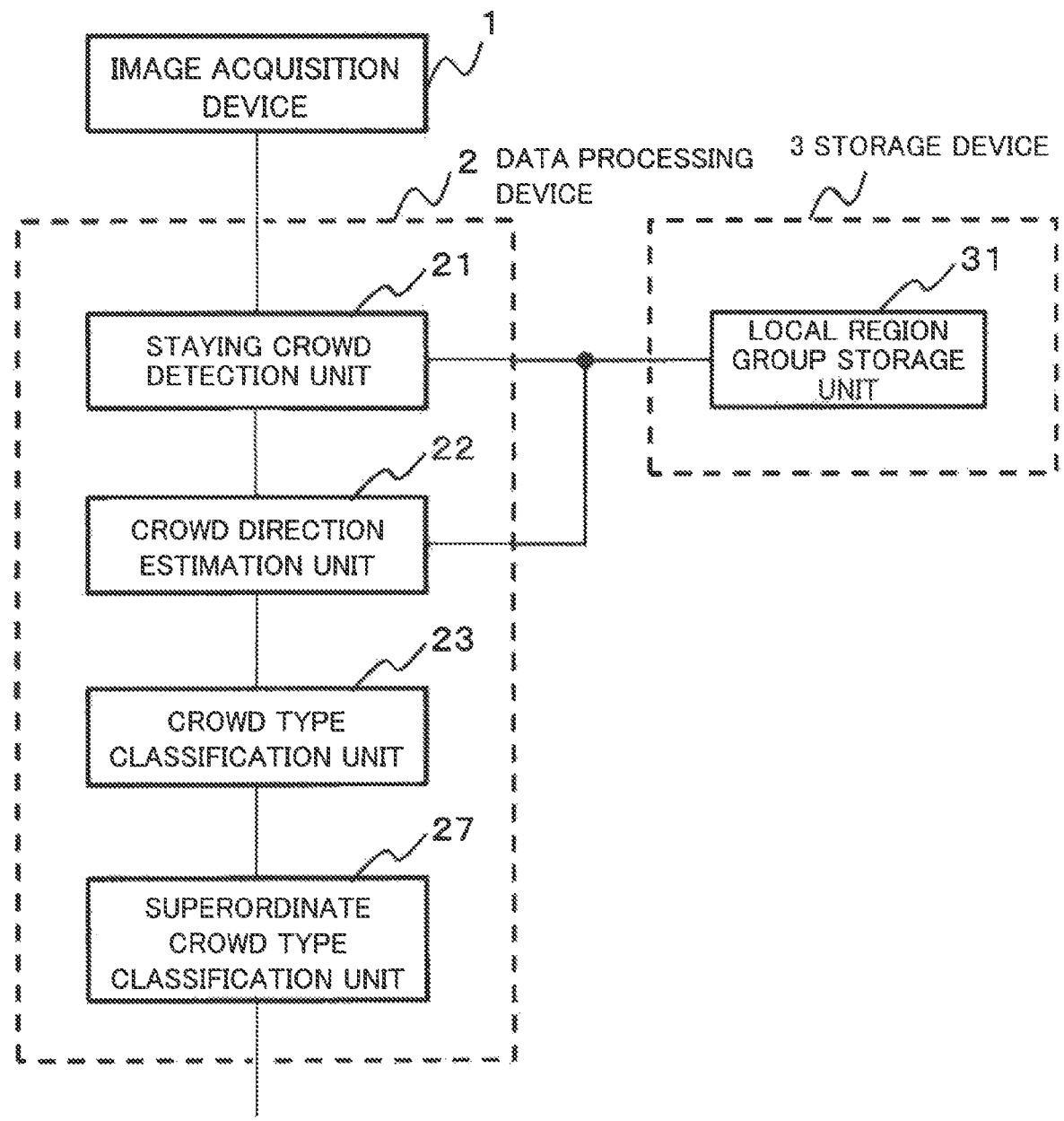
FIG. 13 is a block diagram illustrating a configuration example of a crowd type classification system according to a third example embodiment of the present invention.

FIG. 13 is a block diagram illustrating a configuration example of a crowd type classification system according to a third example embodiment of the present invention. In a crowd type classification system according to the third example embodiment of the present invention, a data processing device 2 includes the staying crowd detection unit 21, the crowd direction estimation unit 22, and the crowd type classification unit 23, and in addition, a superordinate crowd type classification unit 27.

The image acquisition device 1, the staying crowd detection unit 21, the crowd direction estimation unit 22, the crowd type classification unit 23, and the local region group storage unit 31 are similar to those components in the first example embodiment or those components in the second example embodiment, and thus description is omitted here. The crowd type classification system in the third example embodiment performs operations similar to the operations in Steps S1 to S4 in the first example embodiment, or operations similar to the operations in Steps S1 to S4 in the second example embodiment.

By the operations to Step S4, the crowd type and the position of the crowd are determined for each combination of two local regions showing a staying crowd. The positions of the crowd is represented by the positions of the two local regions used for classifying of the crowd type. The crowds whose crowd types and positions are determined by the operations to Step S4 may be referred to as basic crowds. In the present example embodiment, the crowd type classification unit 23 outputs, to the superordinate crowd type classification unit 27, the crowd types and the positions (i.e. the positions of the local regions) and directions of the crowds in two local regions indicating the crowds.

After Step S4, the superordinate crowd type classification unit 27 performs clustering of the crowds on the basis of the crowd types and the positions, and thereby classifies a superordinate crowd. A superordinate crowd is a set into which crowds that are gathered are formed. Therefore, a superordinate crowd is complicated compared with a crowd. The superordinate crowd type classification unit 27 classifies the type of the superordinate crowd on the basis of the crowd types of the crowds belonging to the superordinate crowd, a pattern of arrangement of the local regions, which indicates positions of the crowds belonging to the superordinate crowd, and a pattern of directions of the crowds in the local regions, and outputs the type and the position of the superordinate crowd. The mode of outputting the type and the position of the superordinate crowd is not specifically limited. For example, the superordinate crowd type classification unit 27 may output the type and the position of each superordinate crowd by display, and may output in another mode. The superordinate crowd type classification unit 27 may output the crowd types and the positions of the crowds acquired by the operations to Step S4 together with the type and the position of each superordinate crowd. It can be said that the pattern of arrangement of the local regions indicating the positions of the crowds belonging to the superordinate crowd may is a pattern of arrangement of the local regions indicating the position of the superordinate crowd.

The superordinate crowd type classification unit 27 performs clustering of the crowds, and thereby classifies a cluster whose element is a crowd. A cluster corresponds to a superordinate crowd. When performing clustering of the crowds, the superordinate crowd type classification unit 27 performs clustering so as to cause crowds that are different from each other to be included in the same cluster when a distance between positions of the clusters (in other words, the positions of local regions) is equal to or smaller than a predetermined threshold value and the crowd types of the crowds are common. The cluster acquired by the clustering includes a crowd as an element. In addition, a crowd is individually associated with a position of the crowd (a position of a local region) and a direction of the crowd of the local region relating to the crowd.

The superordinate crowd type classification unit 27 classifies the type of the superordinate crowd acquired by the clustering on the basis of the crowd types of the crowds belonging to the superordinate crowd, a pattern of arrangement of the local regions indicating positions of the crowds belonging to the superordinate crowd, and a pattern of the directions of the crowds in the local regions. The superordinate crowd type classification unit 27 classifies the type of the superordinate crowd for each cluster (i.e. for each superordinate crowd) acquired by the clustering.

Figure 14:
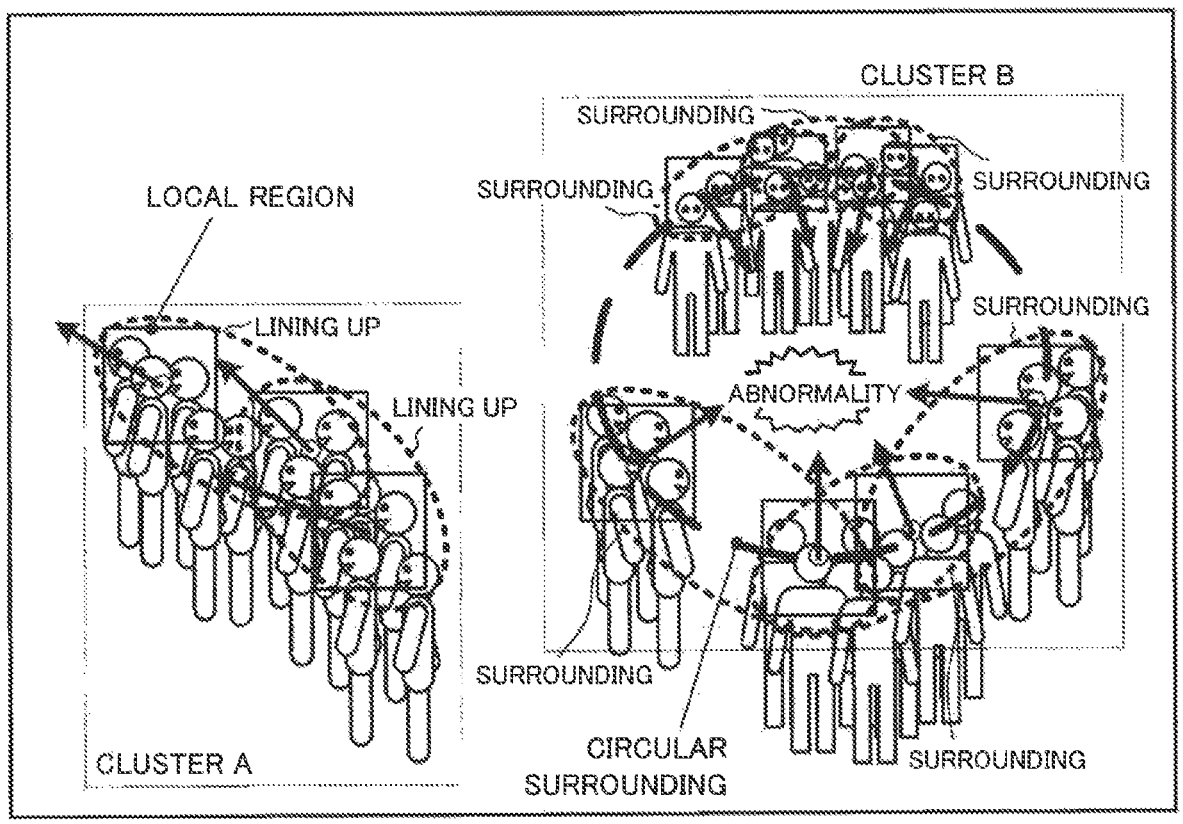
FIG. 14 is an explanatory drawing illustrating an example of classification of a superordinate crowd.

FIG. 14 is an explanatory drawing illustrating an example of classification of a superordinate crowd. FIG. 14 illustrates an image. In FIG. 14, the crowds whose crowd types are classified are indicated by dotted-line ovals surrounding the crowds. In the vicinity of the ovals, the crowd types are noted. Since a crowd type is classified by using two local regions, two local regions are included in one dotted-line oval. In the example illustrated in FIG. 14, local regions whose shapes are rectangles are drawn. One local region may be included in a plurality of dotted-line ovals.

In an image illustrated in FIG. 14, six crowds are classified as "surrounding". As described above, when a distance between positions of crowds different from each other (i.e. positions of local regions) is equal to or smaller than a predetermined threshold value and the crowd types of the crowds are common, the superordinate crowd type classification unit 27 causes the crowds to be included in the same cluster. In the example illustrated in FIG. 14, each of the positions of the above-described six crowds are assumed to be close to a position of a crowd classified as "surrounding" in the vicinity thereof, and a distance between positions (i.e. positions of local regions) of crowds positioned in the vicinity of each other is equal to or smaller than the predetermined threshold value. The crowd types of the six crowds are "surrounding" in common. Therefore, in this example, the superordinate crowd type classification unit 27 performs clustering to cause the six crowds classified as "surrounding" to be included in one cluster (see cluster B illustrated in FIG. 14). Consequently, the superordinate crowd corresponding to the cluster B is fixed. In FIG. 14, the superordinate crowd is represented by a circle in a broken line.

The crowd type belonging to the superordinate crowd which corresponds to the cluster B is "surrounding". The pattern of arrangement of the local regions B is a circle, which represents the positions of the crowds belonging to the superordinate crowd corresponding to the cluster B. The pattern of directions of the crowds of the local regions is a pattern of being directed inward of the circle. The superordinate crowd type classification unit 27 classifies the type of the superordinate crowd corresponding to the cluster B as "circular surrounding" on the basis of the crowd type ("surrounding"), the pattern of arrangement, and the pattern of directions.

For example, the superordinate crowd type classification unit 27 may store association relations between the types of superordinate crowds and combinations of the crowd types of crowds belonging to a superordinate crowd, a pattern of arrangement of local regions indicating positions of the crowds belonging to the superordinate crowd and a pattern of directions of the crowds in the local regions. The superordinate crowd type classification unit 27 may derive the type of the superordinate crowd in such a way that the derived type of the superordinate crowd is associated with the crowd type of crowds belonging to the superordinate crowd, the recognized pattern of arrangement and the recognized pattern of directions.

In the example described above, the exemplified is a case where the superordinate crowd type classification unit 27 classifies "circular surrounding" as the type of the superordinate crowd. The type of the superordinate crowd is not specifically limited. For example, the superordinate crowd type classification unit 27 may classify the type of the superordinate crowd such as "straight lining up", "turning lining up" depending on the crowd type, the pattern of arrangement, and the pattern of directions.

The superordinate crowd type classification unit 27 may determine a position of a superordinate crowd to be the positions of the local regions indicating the positions of the crowds belonging to the superordinate crowd.

The superordinate crowd type classification unit 27 is achieved by, for example, a CPU of a computer which is operating according to the crowd type classification program.

According to the present example embodiment, the superordinate crowd type classification unit 27 classifies the superordinate crowd on the basis of the crowd type and the position of the crowd, which are output from the crowd type classification unit 23. In addition, the superordinate crowd type classification unit 27 classifies the type of the superordinate crowd on the basis of the crowd type of the crowds belonging to the superordinate crowd, a pattern of arrangement of the local regions indicating positions of the crowds belonging to the superordinate crowd, and a pattern of directions of the crowds in the local regions. Therefore, according to the present example embodiment, the type of the superordinate crowd can be classified. In addition, according to the present example embodiment, since the type of the superordinate crowd is classified based on the crowd type, the pattern of arrangement, and the pattern of directions, the conditions for correspondence to the individual types is restricted and thus the type of the superordinate crowd can be classified accurately.

Figure 15:
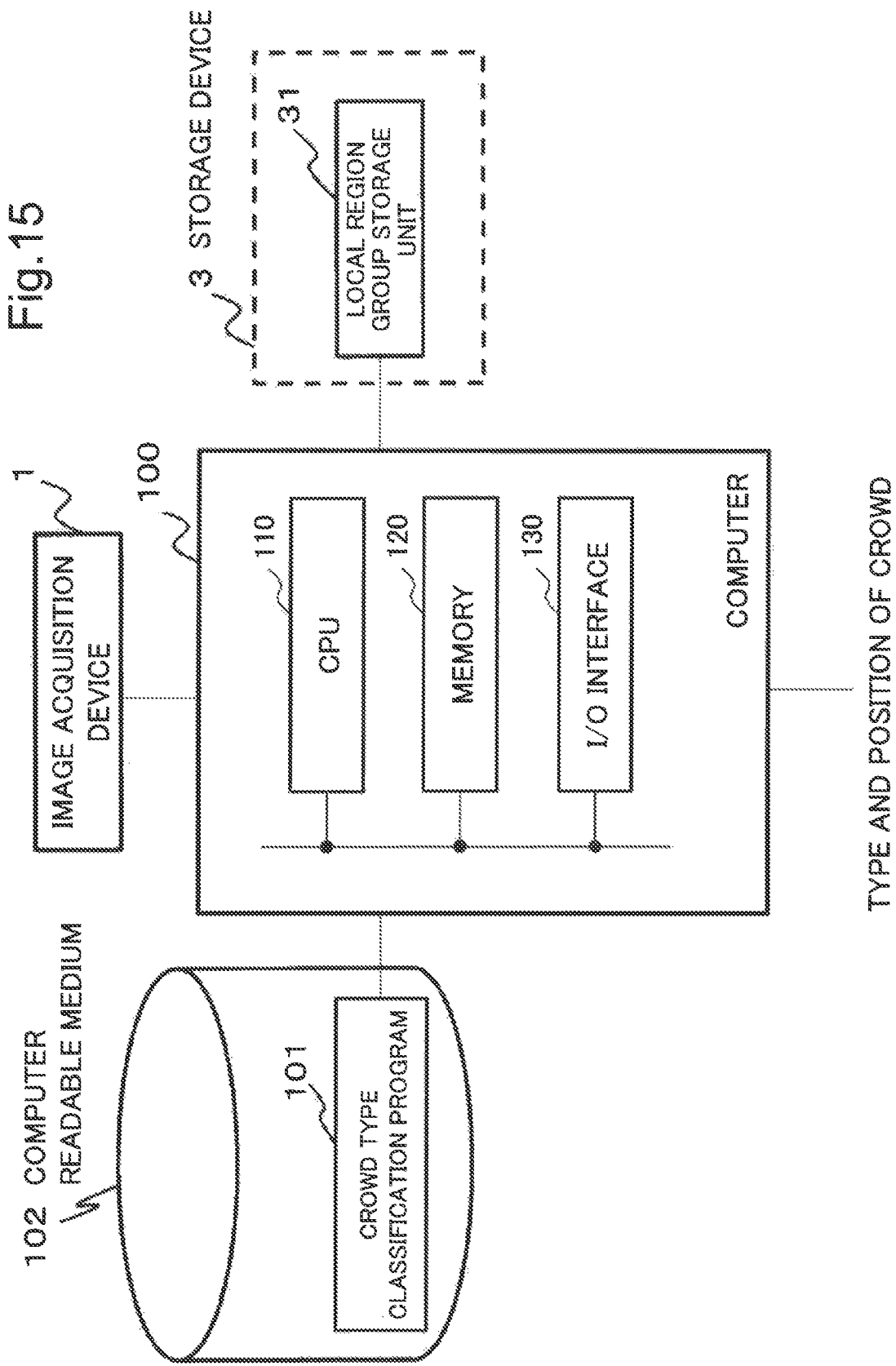
FIG. 15 is a block diagram illustrating a specific configuration example of the crowd type classification system according to the example embodiment of the present invention.

FIG. 15 is a block diagram illustrating a specific configuration example of a crowd type classification system according to the example embodiments of the present invention. The crowd type classification system according to the example embodiments of the present invention includes the image acquisition device 1, the storage device 3, and a computer 100 as illustrated in FIG. 15. The storage device 3 includes the local region group storage unit 31.

The image acquisition device 1 and the storage device 3 are connected with the computer 100. A computer readable medium 102 storing a crowd type classification program 101 is also connected with the computer 100.

The computer readable medium 102 is, for example, a storage device such as a magnetic disk and a semiconductor memory.

The computer 100 includes a CPU 110, a memory 120, and Input/output (I/O) interface 130. The CPU 110, the memory 120, and the I/O interface 130 are communicably connected, for example, via a bus. The CPU 110 communicates, for example, with the image acquisition device 1, the storage device 3, an access device for the computer readable medium 102, a device configured to receive the crowd type and the position of the crowd, and the like via the I/O interface 130. The CPU 110 operates as the above-described CPU.

The computer 100 reads out the crowd type classification program 101 from the computer readable medium 102 at the time of starting, and operates as a data processing device 2 described in the example embodiments according to the crowd type classification program 101. In other words, the computer 100 operates as the staying crowd detection unit 21, the crowd direction estimation unit 22, and the crowd type classification unit 23 of the first example embodiment according to the crowd type classification program 101. The computer 100 may also operate as the detection unit 24 and the crowd type classification unit 23 in the modification (see FIG. 11) of the first example embodiment according to the crowd type classification program 101.

The computer 100 may also operate as the staying crowd detection unit 21, the crowd direction estimation unit 22, and the crowd type classification unit 23 of the second example embodiment according to the crowd type classification program 101. The computer 100 may also operate as the staying crowd detection unit 21, the crowd direction estimation unit 22, and the crowd type classification unit 23 and the superordinate crowd type classification unit 27 of the third example embodiment according to the crowd type classification program 101.

The computer 100 may operate as a data processing device according to a fourth or a fifth example embodiment described below according to the crowd type classification program 101.

Specifically, the CPU 110 of the computer 100 may read out the crowd type classification program 101 from the computer readable medium 102 and load the read crowd type classification program, for example, into the memory 120. The CPU 110 may execute the crowd type classification program loaded in the memory 120. The CPU 110 may operate as any one of the above-described and below-described data processing devices of the example embodiments according to the crowd type classification program 101 loaded in the memory 120.

Each of the data processing devices according to the example embodiments of the present invention may be achieved by dedicated hardware such as a circuit. Each of the data processing devices according to the example embodiments of the present invention may be achieved by a combination of dedicated hardware such as a circuit and the computer 100 including the memory 120 into which the crowd type classification program loaded and the CPU 110 executing the crowd type classification program.

In other words, the staying crowd detection unit 21, the crowd direction estimation unit 22, and the crowd type classification unit 23 in the first example embodiment may be achieved by the CPU 110 executing the crowd type classification program 101 loaded into the memory 120. The staying crowd detection unit 21, the crowd direction estimation unit 22, and the crowd type classification unit 23 according to the first example embodiment may be achieved by dedicated hardware such as a circuit. The staying crowd detection unit 21, the crowd direction estimation unit 22, and the crowd type classification unit 23 according to the first example embodiment may be achieved by a combination of the CPU 110 and the dedicated circuit described above.

The detection unit 24 and the crowd type classification unit 23 according to the modification of the first example embodiment may be achieved by the CPU 110 executing the crowd type classification program 101 loaded into the memory 120. The detection unit 24 and the crowd type classification unit 23 according to the modification of the first example embodiment may be achieved by dedicated hardware such as a circuit. The detection unit 24 and the crowd type classification unit 23 according to the modification of the first example embodiment may be achieved by a combination of the CPU 110 and the dedicated circuit described above.

The staying crowd detection unit 21, the crowd direction estimation unit 22, and the crowd type classification unit 23 according to the second example embodiment may be achieved by the CPU 110 executing the crowd type classification program 101 loaded into the memory 120. The staying crowd detection unit 21, the crowd direction estimation unit 22, and the crowd type classification unit 23 according to the second example embodiment may be achieved by dedicated hardware such as a circuit. The staying crowd detection unit 21, the crowd direction estimation unit 22, and the crowd type classification unit 23 according to the second example embodiment may be achieved by a combination of the CPU 110 and the dedicated circuit described above.

The staying crowd detection unit 21, the crowd direction estimation unit 22, the crowd type classification unit 23, and the superordinate crowd type classification unit 27 according to the third example embodiment may be achieved by the CPU 110 executing the crowd type classification program 101 loaded into the memory 120. The staying crowd detection unit 21, the crowd direction estimation unit 22, the crowd type classification unit 23, and the superordinate crowd type classification unit 27 according to the third example embodiment may be achieved by dedicated hardware such as a circuit. The staying crowd detection unit 21, the crowd direction estimation unit 22, the crowd type classification unit 23, and the superordinate crowd type classification unit 27 according to the third example embodiment may be achieved by a combination of the CPU 110 and the dedicated circuit described above.

The staying crowd detection unit 21, the crowd direction estimation unit 22, and the crowd type classification unit 23 according to the fourth example embodiment described below may be achieved by the CPU 110 executing the crowd type classification program 101 loaded into the memory 120. The staying crowd detection unit 21, the crowd direction estimation unit 22, and the crowd type classification unit 23 according to the fourth example embodiment may be achieved by dedicated hardware such as a circuit. The staying crowd detection unit 21, the crowd direction estimation unit 22, and the crowd type classification unit 23 according to the fourth example embodiment may be achieved by a combination of the CPU 110 and the dedicated circuit described above.

A detection unit 71 and a classification unit 72 according to the fifth example embodiment described below may be achieved by the CPU 110 executing the crowd type classification program 101 loaded into the memory 120. The detection unit 71 and the classification unit 72 according to the fifth example embodiment may be achieved by the dedicated hardware such as a circuit. The detection unit 71 and the classification unit 72 according to the fifth example embodiment may be achieved by a combination of the CPU 110 and the dedicated circuit described above.

Fourth Example Embodiment

A fourth example embodiment of the present invention is described. FIG. 16 is a block diagram illustrating a configuration example of a crowd type classification system according to the present example embodiment. The crowd type classification system according to the present example embodiment includes a staying crowd detection unit 21, a crowd direction estimation unit 22, and a crowd type classification unit 23. The crowd type classification system of the present example embodiment may be implemented as a single device (for example, a data processing device including the staying crowd detection unit 21, the crowd direction estimation unit 22, and the crowd type classification unit 23). The crowd type classification system of the present example embodiment may be implemented as a plurality of devices communicably connected with each other.

The staying crowd detection unit 21 detects a local region indicating a staying crowd from local regions determined in an image acquired by an image acquisition device (for example, the image acquisition device 1 described above).

The crowd direction estimation unit 22 estimates a direction of the crowd for an image (for example, the above-described local region image) of a part corresponding to the local region detected by the staying crowd detection unit 21, and appends the direction of the crowd to the local region.

The crowd type classification unit 23 classifies a type of the crowd including a plurality of staying persons by using a relative vector indicating a relative positional relationship of two local regions to each of which the direction of the crowd is appended by the crowd direction estimation unit 22 and directions of the crowds in the two local regions, and outputs the type and the position of the crowd.

By this configuration, various types of the staying crowds included in an image can be classified.

Fifth Example Embodiment

A fifth example embodiment of the present invention is described below. FIG. 17 is a block diagram illustrating a configuration example of a crowd type classification system according to the present example embodiment. In an example illustrated in FIG. 17, the crowd type classification system according to the present example embodiment includes a detection unit 71 and an classification unit 72. The crowd type classification system of the present example embodiment is implemented as a single device (for example, a data processing device including the detection unit 71 and the classification unit 72). The crowd type classification system of the present example embodiment may be implemented as a plurality of devices communicably connected with each other.

The detection unit 71 (for example, the staying crowd detection unit 21, and the detection unit 24 described above) detects a plurality of partial regions (for example, the local regions described above) each indicating staying crowds from an image.

The classification unit 72 (for example, the crowd type classification unit 23) analyzes a first partial region and a second partial region, and classifies a types of crowds of the first partial region and the second partial region.

In this configuration, various types of the staying crowds included in the image may be classified.

The configuration thereof may include an estimation unit (for example, the crowd direction estimation unit 22 described above) configured to estimate a direction of a crowd of each of a first partial region and a second partial region, wherein the classification unit 72 includes: a calculation unit (for example, the relative vector calculation unit 231 described above) configured to calculate a direction (for example, the above-described relative vector) to the second partial region from the first partial region; and an analysis unit (for example, the above-described analysis unit 232) configured to classify a type of crowds in the first partial region and the second partial region based on a direction of the crowd in the first partial region, a direction of the crowd in the second partial region, and the direction to the second partial region from the first partial region.

The example embodiments of the present invention described above may be described as Supplementary Notes described below, but are not limited to the followings.

(Supplementary Note 1)

A crowd type classification system including:

staying crowd detection means for detecting a local region indicating a crowd in staying from a plurality of local regions determined in an image acquired by an image acquisition device;

crowd direction estimation means for estimating a direction of the crowd for an image of a part corresponding to the local region detected by the staying crowd detection means, and appending the direction of the crowd to the local region; and crowd type classification means for classifying a type of the crowd including a plurality of staying persons for the local region to which the direction is appended by the crowd direction estimation means by using a relative vector indicating a relative positional relationship between two local regions and directions of crowds in the two local regions, and outputting the type and positions of the crowds.

(Supplementary Note 2)

The crowd type classification system according to Supplementary Note 1, wherein the crowd type classification means classifies the type of the crowd by using the two local regions, the relative vector of the two local regions having a magnitude not larger than a predetermined magnitude.

(Supplementary Note 3)

The crowd type classification system according to Supplementary Note 1 or Supplementary Note 2, wherein the staying crowd detection means estimates, for the image of the part corresponding to the local region, a staying degree of objects and a count of persons within the local region, the staying degree indicating a state of staying of the objects, the count of persons representing a density of the crowd, and detects the local region indicating the crowd in staying based on the staying degree of the objects and the count of persons.

(Supplementary Note 4)

The crowd type classification system according to any one of Supplementary Note 1 to Supplementary Note 3, wherein the crowd direction estimation means does not append the direction of the crowd to a local region relating to the direction of the crowd if a reliability of the direction of the crowd is low when estimating the direction of the crowd.

(Supplementary Note 5)

The crowd type classification means according to any one of Supplementary Note to Supplementary Note 4, further including superordinate crowd type classification means for deriving a superordinate crowd by using types and positions of crowds output by the crowd type classification means, classifying a type of the superordinate crowd based on the types of the crowds belonging to the superordinate crowd, a pattern of arrangement of the plurality of local regions, and a pattern of directions of the crowds in the plurality of local regions, the pattern of arrangement indicating a position of the superordinate crowd, and outputting the type and the position of the superordinate crowd.

(Supplementary Note 6)

The crowd type classification system according to Supplementary Note 5, wherein the superordinate crowd type classification means derives the superordinate crowd by performing clustering of the crowds by using the types and the positions of the crowds, and classifies the type of the superordinate crowd for each cluster derived by the clustering.

(Supplementary Note 7)

The crowd type classification system according to Supplementary Note 3, wherein the staying crowd detection means applies a result of a local-region-based leaning to any or both of estimation of the staying degree of the objects and estimation of the count of persons.

(Supplementary Note 8)

The crowd type classification system according to any one of Supplementary Note 1 to Supplementary Note 7, wherein the crowd direction estimation means applies a result of a local-region-based leaning to estimation of the direction of the crowd.

(Supplementary Note 9)

A crowd type classification system including:

detection means for detecting a plurality of partial regions each indicating crowds in staying in an image; and classification means for analyzing a first partial region and a second partial region, and classifying types of the crowds in the first partial region and the second partial region.

(Supplementary Note 10)

The crowd type classification system according to Supplementary Note 9, including estimating means for estimating a direction of a crowd in each of the first partial region and the second partial region, wherein the classification means includes:

calculation means for calculating a direction to the second partial region from the first partial region; and analysis means for classifying the types of the crowds in the first partial region and the second partial region based on the direction of the crowd in the first partial region, the direction of the crowd in the second partial region and the direction to the second partial region from the first partial region.

(Supplementary Note 11)

A crowd type classification method including:

detecting a local region indicating a crowd in staying in local regions determined in an image acquired by an image acquisition device;

estimating a direction of the crowd for an image of a part corresponding to the local region detected and appending the direction of the crowd to the local region detected; and classifying a type of the crowd including a plurality of staying persons for the local region with the direction of the crowd by using a relative vector indicating a relative positional relationship between two local regions and directions of crowds in the two local regions, and outputting the type and positions of the crowd.

(Supplementary Note 12)

The crowd type classification method according to Supplementary Note 11, including:

classifying the type of the crowd by using the two local regions, the relative vector of the two local regions having a magnitude not larger than a predetermined magnitude.

(Supplementary Note 13)

The crowd type classification method according to Supplementary Note 11 or Supplementary Note 12, including:

estimating, for an image of a part corresponding to the local region, a staying degree of objects and a count of persons within the local region, the staying degree indicating a state of staying of the objects, the count of persons representing a density of the crowd, and detecting the local region indicating the crowd in staying, based on the staying degree of the objects and the count of persons.

(Supplementary Note 14)

The crowd type classification method according to any one of Supplementary Note 11 to Supplementary Note 13, wherein the direction of the crowd is not appended to a local region relating to the direction of the crowd if a reliability of the direction of the crowd is low when estimating the direction of the crowd.

(Supplementary Note 15)

The crowd type classification method according to any one of Supplementary Note 11 to Supplementary Note 14, further including:

deriving a superordinate crowd by using types and positions of crowds;

classifying a type of the superordinate crowd, based on the type of the crowd belonging to the superordinate crowd, a pattern of arrangement of the plurality of local regions, and a pattern of directions of the crowds in the plurality of local regions, the pattern of arrangement indicating a position of the superordinate crowd; and outputting the type and the position of the superordinate crowd.

(Supplementary Note 16)

The crowd type classification method according to Supplementary Note 15, including:

deriving the superordinate crowd by performing clustering of the crowds by using the types and the positions of the crowds; and classifying the type of the superordinate crowd for each cluster derived by the clustering.

(Supplementary Note 17)

The crowd type classification method according to Supplementary Note 13, including applying a result of a local-region-based leaning to either any or both of estimation of the staying degree of objects and estimation of the count of persons.

(Supplementary Note 18)

The crowd type classification method according to any one of Supplementary Note 11 to Supplementary Note 17, including applying a result of a local-region-based leaning to estimation of the direction of the crowd.

(Supplementary Note 19)

A crowd type classification method including:

detecting a plurality of partial regions each indicating crowds in staying in an image; and analyzing a first partial region and a second partial region, and classifying types of the crowds in the first partial region and the second partial region.

(Supplementary Note 20)

The crowd type classification method according to Supplementary Note 19, further including:

estimating a directions of a crowd in each of the first partial region and the second partial region; and when classifying the crowd type, calculating a direction to the second partial region from the first partial region, and classifying the types of the crowds in the first partial region and the second partial region based on the direction of the crowd in the first partial region, the direction of the crowd in the second partial region, and the direction to the second partial region from the first partial region.

(Supplementary Note 21)

A storage medium storing a crowd type classification program causing a computer to execute:

a staying crowd detection process of detecting a local region indicating a crowd in staying in local regions determined in an image acquired by an image acquisition device;

a crowd direction estimation process of estimating a direction of the crowd for an image of a part corresponding to the local region detected and appending the direction of the crowd to the local region detected; and a crowd type classification process of classifying a type of the crowd including a plurality of staying persons for the local region to which the direction is appended by the crowd direction estimation process by using a relative vector indicating a relative positional relationship between two local regions and directions of crowds in the two local regions and outputting the type and positions of the crowd.

(Supplementary Note 22)

The storage medium according to Supplementary Note 21, storing the crowd type classification program causing the computer to execute:

the crowd type classification process that classifies the type of the crowd by using the two local regions, the relative vector of the two local regions having a magnitude not larger than a predetermined magnitude.

(Supplementary Note 23)

The storage medium according to Supplementary Note 21 or Supplementary Note 22, storing the crowd type classification program causing the computer to execute:

the staying crowd detection process that estimates, for an image of a part corresponding to the local region, a staying degree of objects and a count of persons within the local region, the staying degree indicating a state of staying of the objects, the count of persons representing a density of the crowd, and detects the local region indicating the crowd in staying based on the staying degree of the objects and the count of persons.

(Supplementary Note 24)

The storage medium according to any one of Supplementary Note 21 to Supplementary Note 23, storing the crowd type classification program causing a computer to execute:

the crowd direction estimation process that does not append a direction of the crowd is to a local region relating to the direction of the crowd if a reliability of the direction of the crowd is low when estimating the direction of the crowd.

(Supplementary Note 25)

The storage medium according to any one of Supplementary Note 21 to Supplementary Note 24, storing the crowd type classification program causing the computer to execute a superordinate crowd type classification process of deriving a superordinate crowd by using types and positions of crowds output by the crowd type classification process, classifying the type of the superordinate crowd based on the types of the crowds belonging to the superordinate crowd, a pattern of arrangement of the plurality of local regions, and a pattern of directions of the crowds in the plurality of local regions, the pattern of arrangement indicating a position of the superordinate crowd, and outputting the type and the position of the superordinate crowd.

(Supplementary Note 26)

The storage medium according to Supplementary Note 25, storing the crowd type classification program causing the computer to execute the superordinate crowd type classification process that derives the superordinate crowd by performing clustering of the crowds by using the types and the positions of the crowds, and classifies the type of the superordinate crowd for each cluster derived by the clustering.

(Supplementary Note 27)

The storage medium according to Supplementary Note 23, storing a crowd type classification program causing the computer to execute the staying crowd detection process that applies a result of a local-region-based leaning to either any or both of estimation of the staying degree of objects and estimation of the count of persons.

(Supplementary Note 28)

The storage medium according to any one of Supplementary Note 21 to Supplementary Note 27, storing the crowd type classification program causing the computer to execute the crowd direction estimation process that applies a result of a local-region-based leaning to the estimation of direction of the crowd.

(Supplementary Note 29)

A storage medium storing a crowd type classification program causing a computer to execute:

a detection process of detecting a plurality of partial regions each indicating crowds in staying in an image; and a classification process of analyzing a first partial region and a second partial region, and classifying types of the crowds in the first partial region and the second partial region.

(Supplementary Note 30)

The storage medium according to Supplementary Note 29, storing the crowd type classification program causing the computer to execute an estimation process of estimating a direction of a crowd in each of the first partial region and the second partial region, wherein the classification process includes:

a calculation process of calculating the direction to the second partial region from the first partial region; and an analysis process of classifying the types of the crowds in the first partial region and the second partial region based on the direction of the crowd in the first partial region, the direction of the crowd in the second partial region and the direction to the second partial region from the first partial region.

Although the present invention has been described with reference to the example embodiments, the present invention is not limited to the example embodiments described above. In other words, various modifications understood by those skilled in the art can be made for the configuration and details of the present invention without departing from the scope of the present invention.

INDUSTRIAL APPLICABILITY

The present invention is suitably applied to a crowd type classification system configured to classify a crowd type of a crowd included in the image. The present invention can also be used, for example, for suspicious person recognition in a monitoring field requiring classification of a crowd type, recognition of leaving of a suspicious object, abnormal state recognition, abnormal behavior recognition. The present invention may also be used for behavior analysis in the field of marketing, analysis of environmental conditions, etc., for example. The present invention may further be applied to an application as an input interface configured to send a type and a position of a crowd to another device. The present invention may also be applied to, for example a video/image search device which uses the type and the position of the crowd as a trigger key.

REFERENCE SIGNS LIST

1 Image acquisition device
2 Data processing device
3 Storage device
21 Staying crowd detection unit
22 Crowd direction estimation unit
23 Crowd type classification unit
24 Detection unit
27 Superordinate crowd type classification unit
31 Local region group storage unit
71 Detection unit
72 Classification unit
100 Computer
101 Crowd type classification program
102 Computer readable medium
110 CPU
120 Memory
130 I/O interface
211 Staying state estimation unit
212 Number-of-persons estimation unit 213 Local region detection unit
221 Direction estimation unit
222 Data append unit
231 Relative vector calculation unit
232 Analysis unit

The invention claimed is:

1. A crowd type identification system, comprising:
at least one memory that stores instructions; and
at least one processor configured to execute the instructions to:
detect a first region and a second region each of which includes a staying crowd in an image;
analyze a relation between the first region and the second region; and
determine, based on the relation, if a type of crowds in the first region and the second region is surrounding.

2. The crowd type identification system according to claim 1, wherein
the at least one processor is further configured to
determine if the type is the surrounding based on the relation represented by a direction of the crowd in the first region, a direction of the crowd in the second region, a direction of a relative vector between the first region and the second region and a direction of an intersection point vector, the direction of the intersection point vector being a direction from the first region or the second region to a cross point of a first line and a second line, the first line being a line whose direction is the direction of the crowd in the first region, the second line being a line whose direction is the direction of the crowd in the second region.

3. The crowd type identification system according to claim 2, wherein
The at least one processor is further configured to
determine that the type is the surrounding when directions of a first cross product, a second cross product and a third cross product are same, the first cross product being a cross product of the relative vector and a vector of the direction of the crowd in the first region, the second cross product being a cross product of the relative vector and a vector of the direction of the crowd in the second region, the third cross product being a cross product of the relative vector and the cross point vector.

4. The crowd type identification system according to claim 1, wherein
the at least one processor is further configured to
detect a spot based on a direction of the crowd in the first region and a direction of the crowd in the second region, the spot being an abnormality spot or focused spot.

5. The crowd type identification system according to claim 1, wherein
a directions of a crowd in each of the first region and the second region is a direction to which faces of a majority of persons of the crowd, a direction to which bodies of a majority of the persons of the crowd or a direction in which a majority of the persons are watching.

6. A crowd type identification method, comprising:
detecting a first region and a second region each of which includes a staying crowd in an image;
analyzing a relation between the first region and the second region; and
determining, based on the relation, if a type of crowds in the first region and the second region is surrounding.

7. The crowd type identification method according to claim 6, wherein
the determining includes determining if the type is the surrounding based on the relation represented by a direction of the crowd in the first region, a direction of the crowd in the second region, a direction of a relative vector between the first region and the second region and a direction of an intersection point vector, the direction of the intersection point vector being a direction from the first region or the second region to a cross point of a first line and the second line, the first line being a line whose direction is the direction of the crowd in the first region, the second line being a line whose direction is the direction of the crowd in the second region.

8. The crowd type identification method according to claim 7, wherein
the determining includes determining that the type is the surrounding when directions of a first cross product, a second cross product and the third second cross product are same, the first cross product being a cross product of the relative vector and a vector of the direction of the crowd in the first region, the second cross product being a cross product of the relative vector and a vector of the direction of the crowd in the second region, the third cross product being a cross product of the relative vector and the cross point vector.

9. The crowd type identification method according to claim 6, further comprising
detecting a spot based on a direction of the crowd in the first region and a direction of the crowd in the second region, the spot being an abnormality spot or focused spot.

10. The crowd type identification method according to claim 6, wherein
a directions of a crowd in each of the first region and the second region is a direction to which faces of a majority of persons of the crowd, a direction to which bodies of a majority of the persons of the crowd or a direction in which a majority of the persons are watching.

11. A non-transitory computer readable storage medium storing a program causing a computer to execute:
detection processing of detecting a first region and a second region each of which includes a staying crowd in an image;
analysis processing of analyzing a relation between the first region and the second region; and
determination processing of determining, based on the relation, if a type of crowds in the first region and the second region is surrounding.

12. The storage medium according to claim 11, wherein
the determination processing determines if the type is the surrounding based on the relation represented by a direction of the crowd in the first region, a direction of the crowd in the second region, a direction of a relative vector between the first region and the second region and a direction of an intersection point vector, the direction of the intersection point vector being a direction from the first region or the second region to a cross point of a first line and a second line, the first line being a line whose direction is the direction of the crowd in the first region, the second line being a line whose direction is the direction of the crowd in the second region.

13. The storage medium according to claim 12, wherein
the determination processing determines that the type is the surrounding when directions of a first cross product, a second cross product and a third cross product are same, the first cross product being a cross product of the relative vector and a vector of the direction of the crowd in the first region, the second cross product being a cross product of the relative vector and a vector of the direction of the crowd in the second region, the third cross product being a cross product of the relative vector and the cross point vector.

14. The storage medium according to claim 11, wherein the determination processing further detects a spot based on a direction of the crowd in the first region and a direction of the crowd in the second region, the spot being an abnormality spot or focused spot.

15. The storage medium according to claim 11, wherein a directions of a crowd in each of the first region and the second region is a direction to which faces of a majority of persons of the crowd, a direction to which bodies of a majority of the persons of the crowd or a direction in which a majority of the persons are watching.

\* \* \* \* \*